(12) United States Patent
Roberts

(10) Patent No.: US 7,971,804 B2
(45) Date of Patent: *Jul. 5, 2011

(54) CHANNELED SHAFT CHECK VALVE ASSEMBLIES

(76) Inventor: James C. Roberts, Escondido, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/365,109

(22) Filed: Feb. 3, 2009

(65) Prior Publication Data
US 2009/0173904 A1  Jul. 9, 2009

Related U.S. Application Data

(63) Continuation-in-part of application No. 12/361,227, filed on Jan. 28, 2009, now abandoned, which is a continuation-in-part of application No. 11/804,690, filed on May 18, 2007, now Pat. No. 7,686,235, which is a continuation-in-part of application No. 11/060,852, filed on Feb. 18, 2005, now abandoned, which is a continuation-in-part of application No. 10/973,546, filed on Oct. 26, 2004, now Pat. No. 7,293,721.

(51) Int. Cl.
B05B 15/10 (2006.01)

(52) U.S. Cl. ........ 239/204; 239/203; 239/205; 239/570; 239/579; 239/583; 239/533.13; 137/71; 251/149.2

(58) Field of Classification Search .......... 239/203–205, 239/570, 579, 583, 533.13; 137/71; 251/149.2
See application file for complete search history.

(56) References Cited

U.S. PATENT DOCUMENTS

| | | | | |
|---|---|---|---|---|
| 4,712,583 A | * | 12/1987 | Pelmulder et al. | 137/852 |
| 4,842,198 A | * | 6/1989 | Chang | 239/200 |
| 4,848,661 A | * | 7/1989 | Palmer et al. | 239/204 |
| 5,613,663 A | * | 3/1997 | Schmidt et al. | 251/149.2 |
| 6,179,221 B1 | | 1/2001 | Goldberg | |
| 6,499,678 B1 | | 12/2002 | Hope | |
| 7,293,721 B2 | * | 11/2007 | Roberts | 239/204 |
| 7,686,235 B2 | * | 3/2010 | Roberts | 239/204 |

* cited by examiner

*Primary Examiner* — Dinh Q Nguyen
(74) *Attorney, Agent, or Firm* — Gordon & Rees LLP

(57) ABSTRACT

A channeled shaft check valve assembly includes a conduit with an internal valve seat with a central opening. An actuating member is contained inside the conduit between an outlet fixture and the valve seat. A valve member mounted within the sleeve includes a disc on the opposite side of the valve seat from the outlet end of the conduit and a channeled shaft extending outward from the center of the disc and through the central opening in the internal valve seat. The opposite end of the channeled shaft may also have a disc mounted thereto, allowing for a three position valve. The valve is urged closed under pressure unless an outlet fixture urges the valve open allowing fluid flow along the channeled shaft and through the central opening in the valve seat. In a two disc valve member, the valve may have two closed positions and one open position.

8 Claims, 34 Drawing Sheets

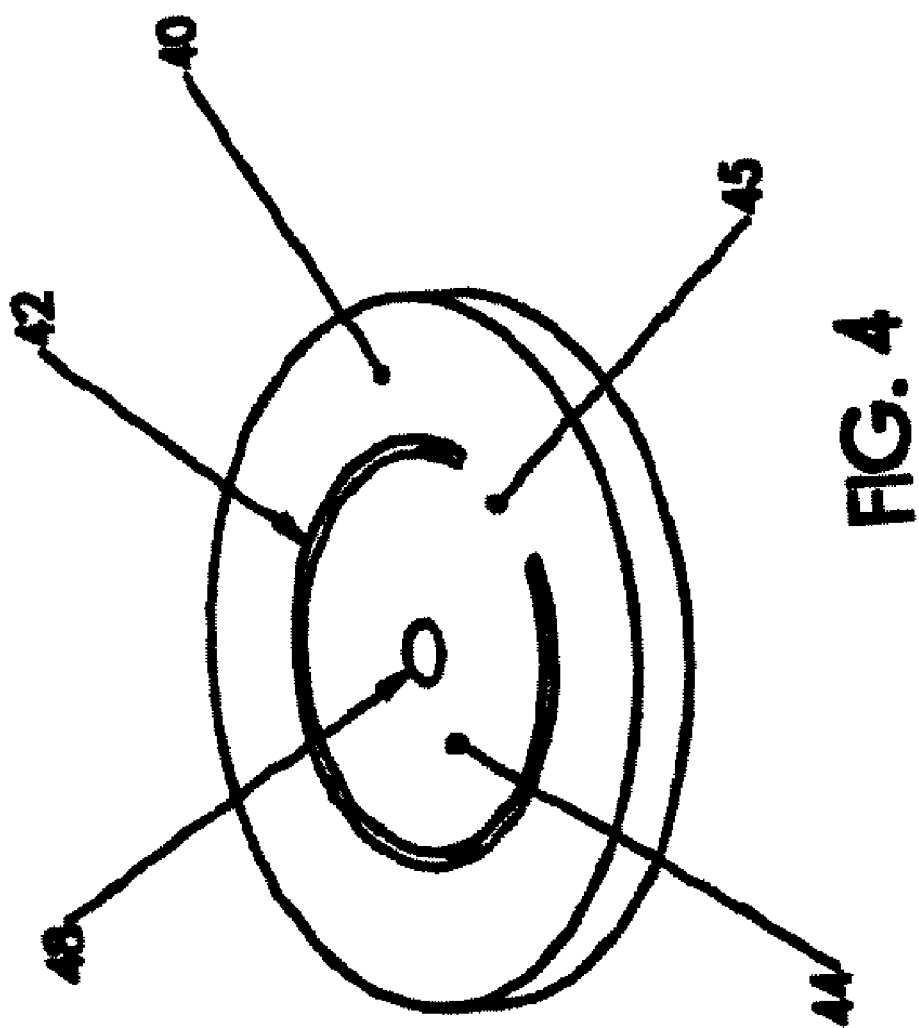

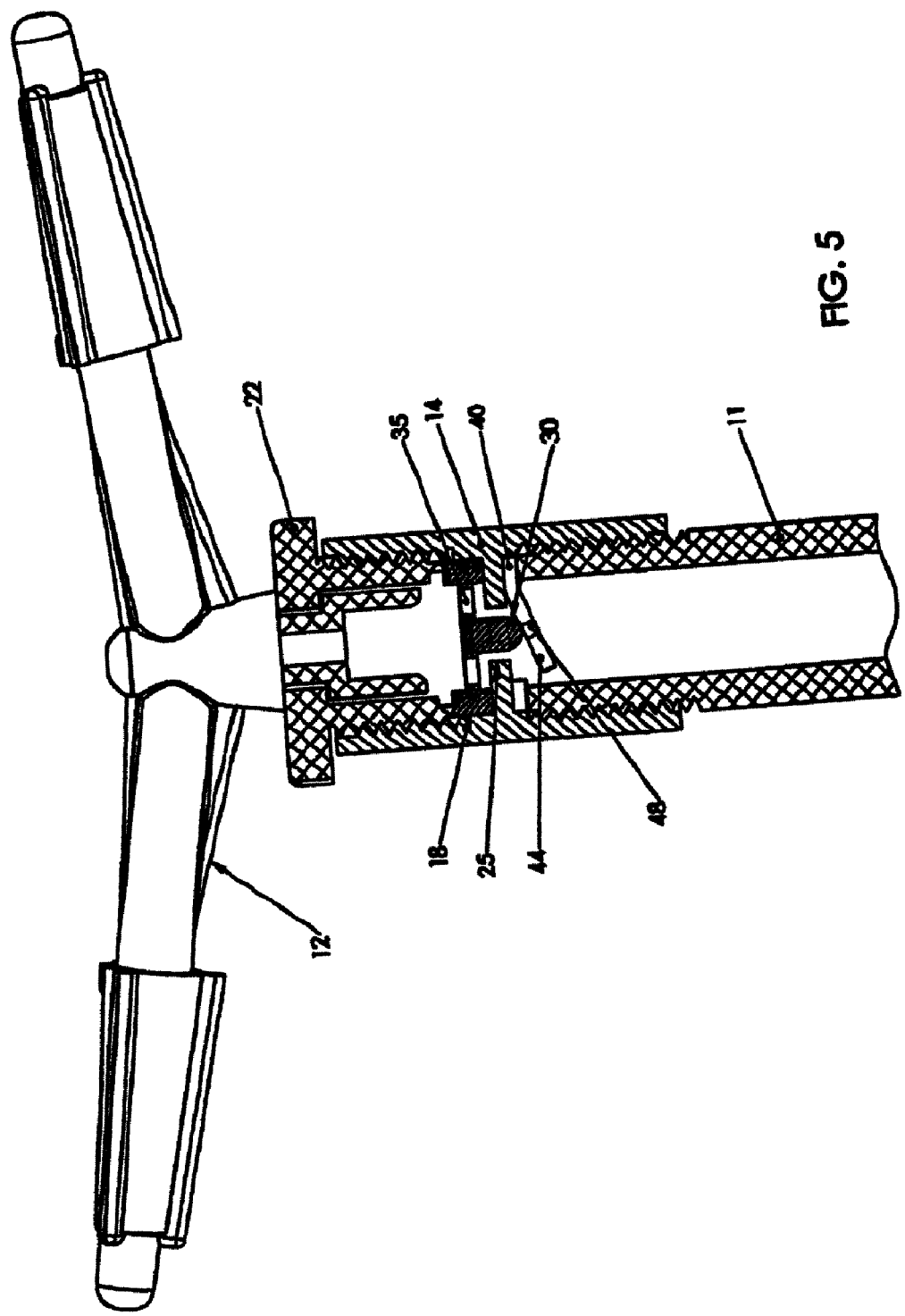

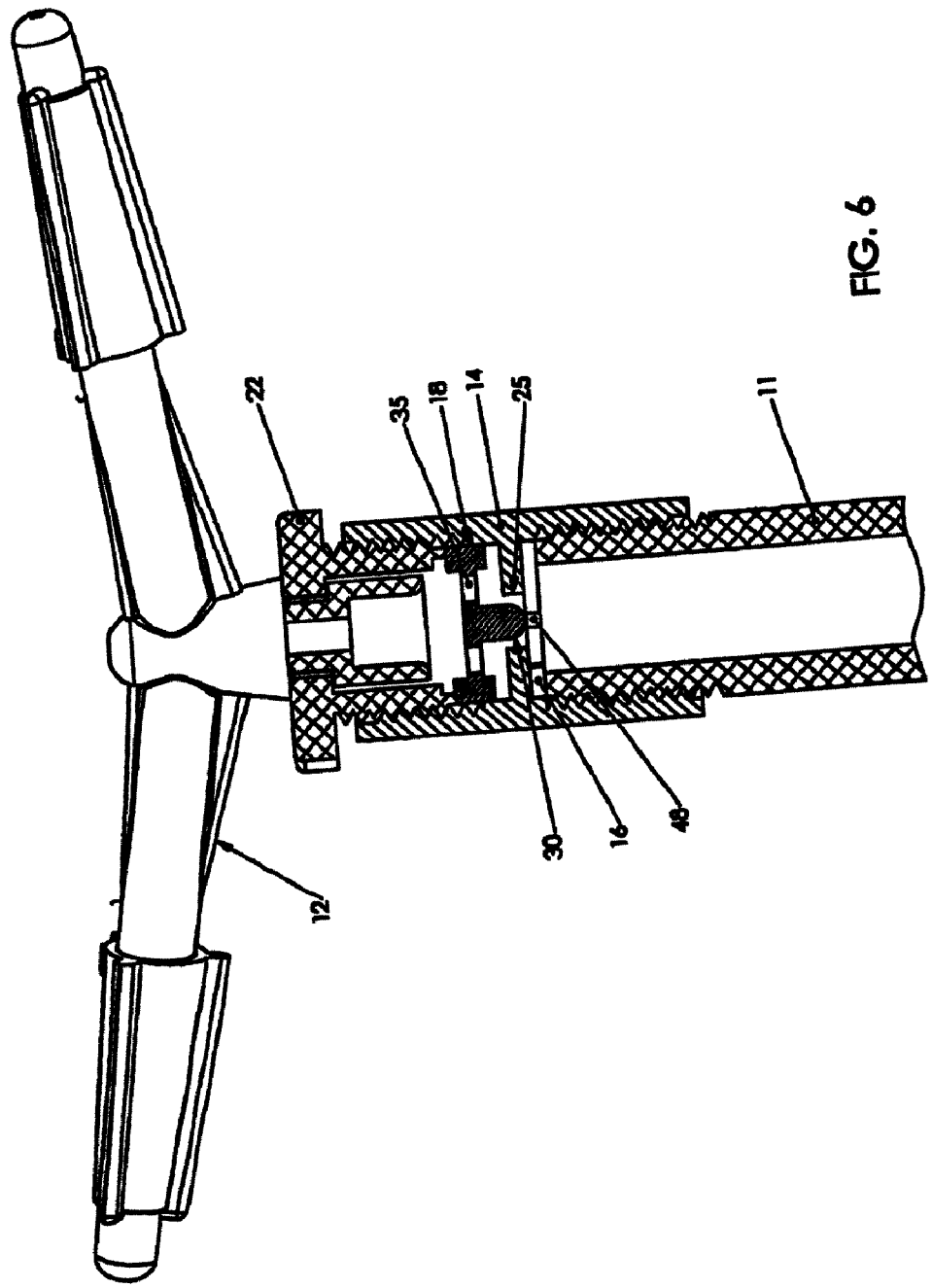

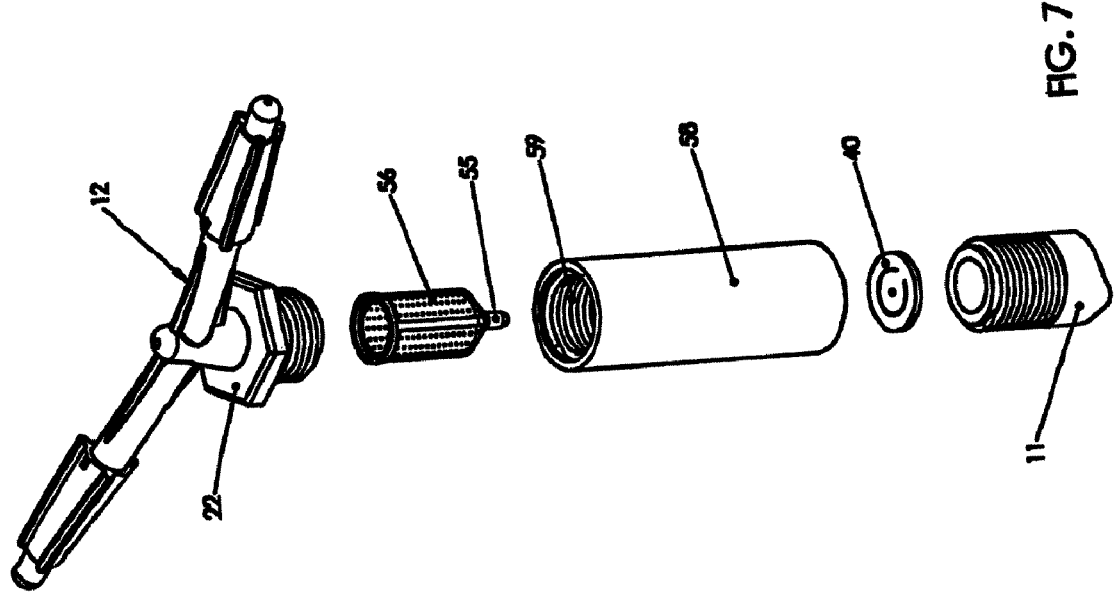

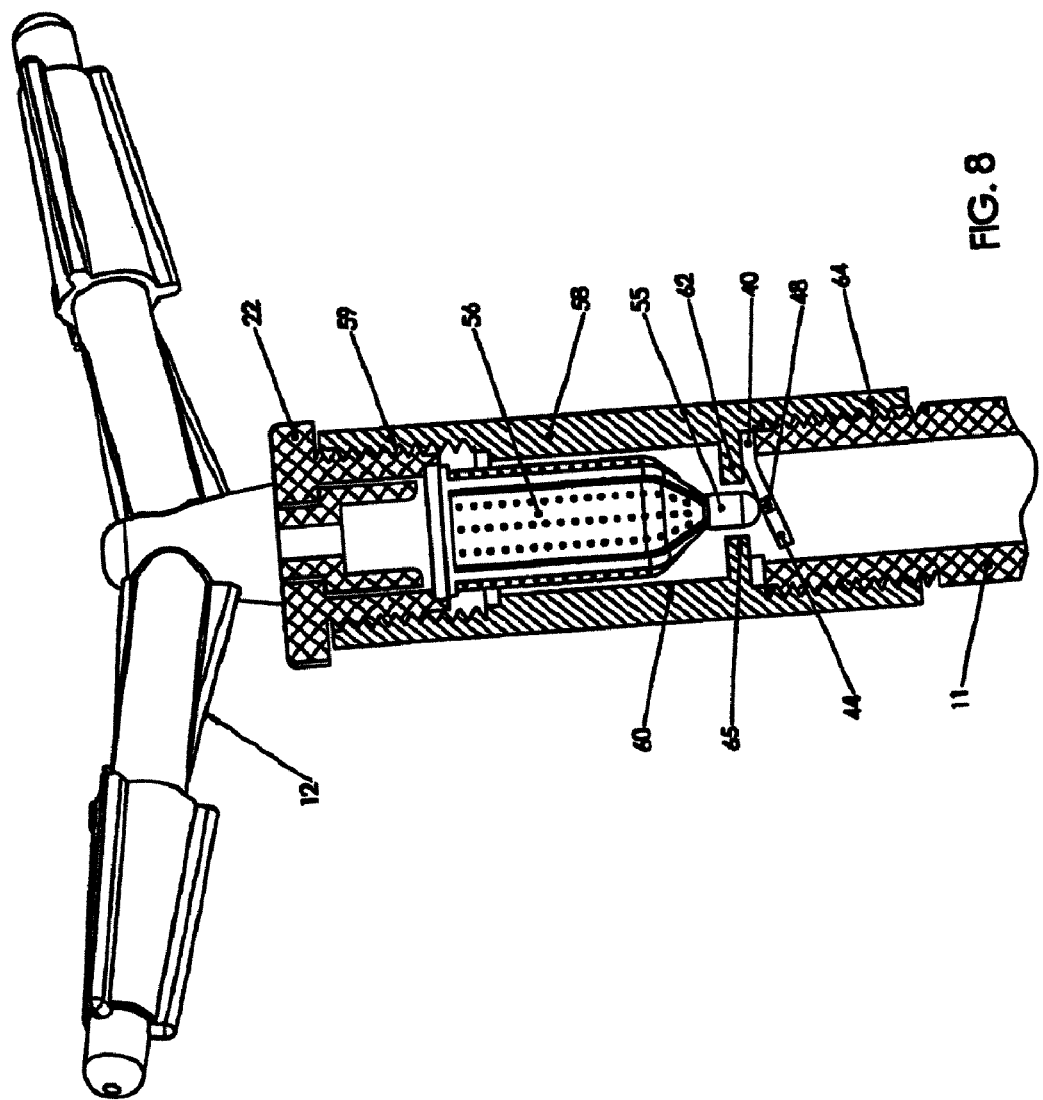

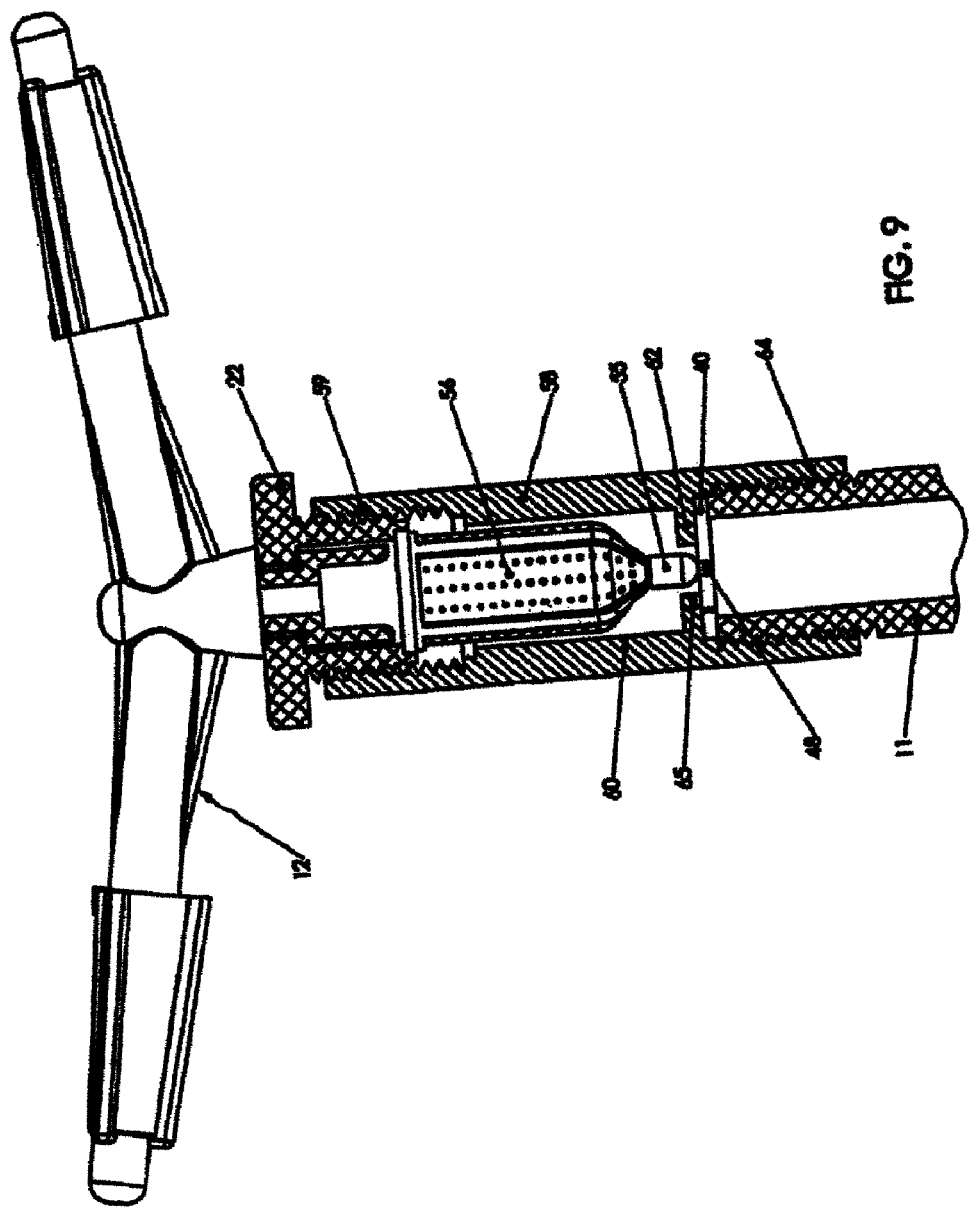

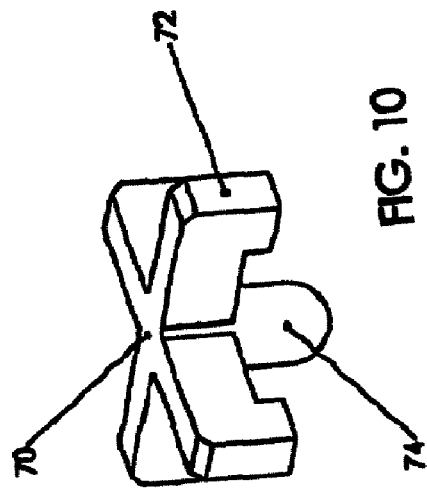
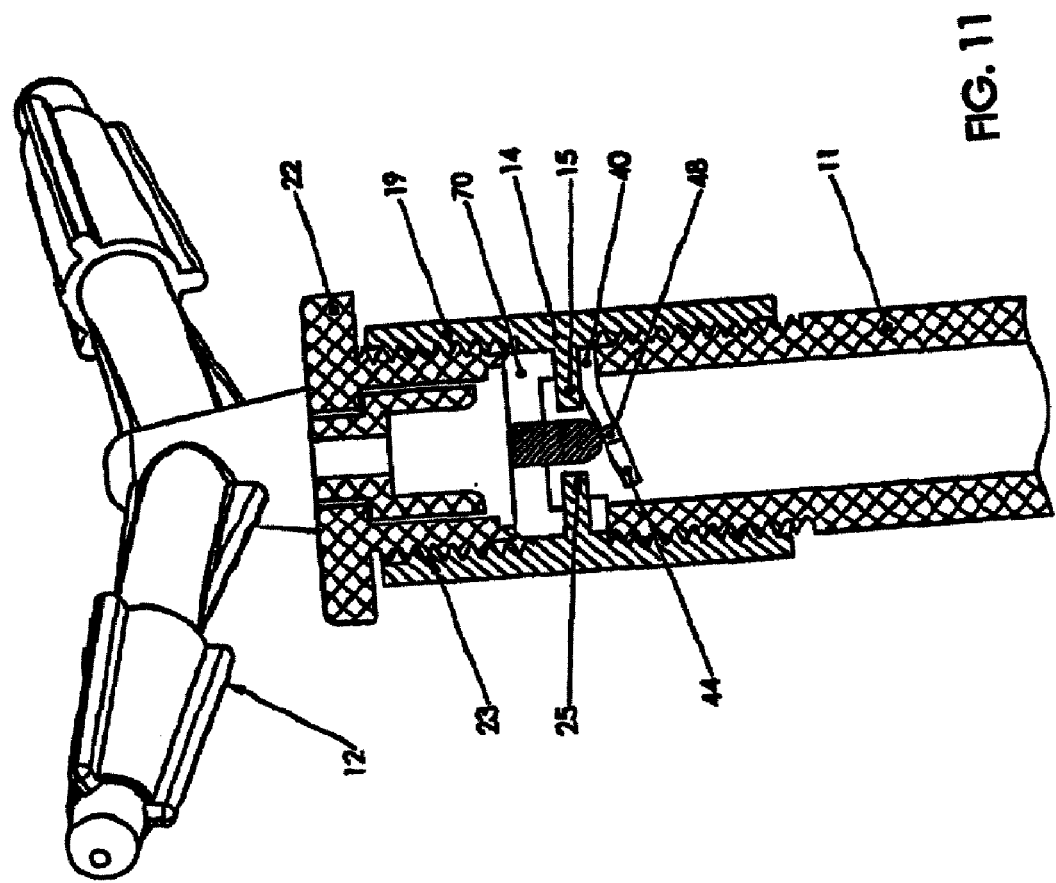

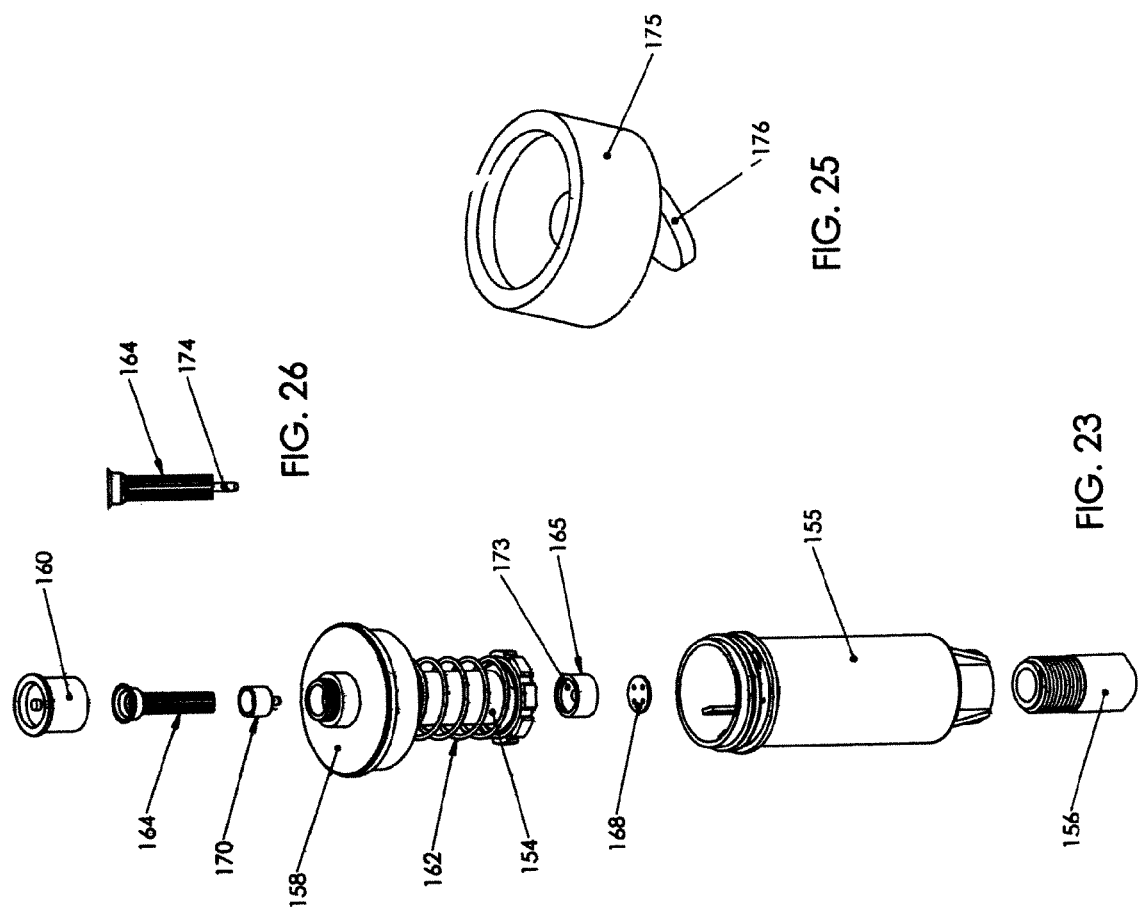

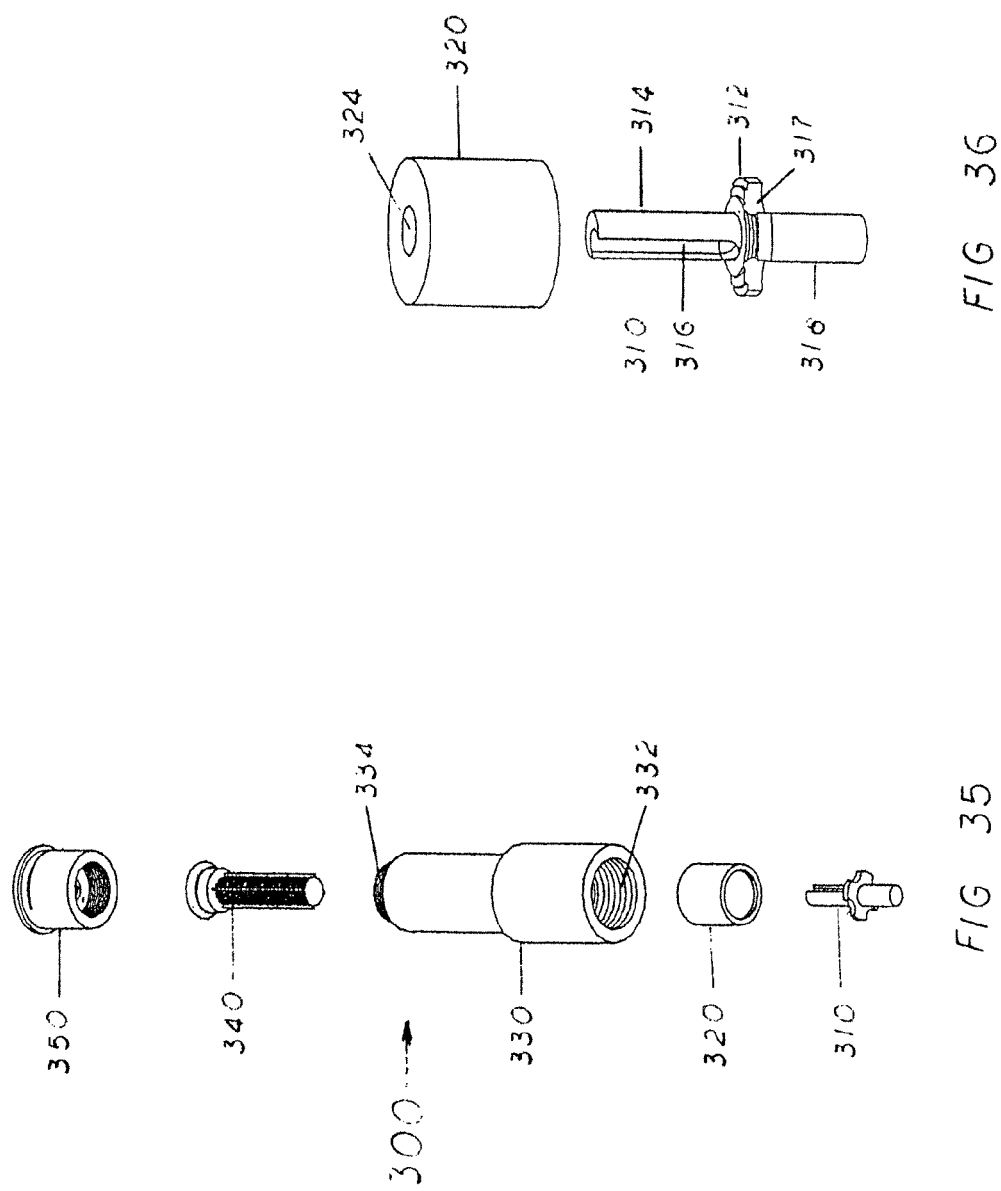

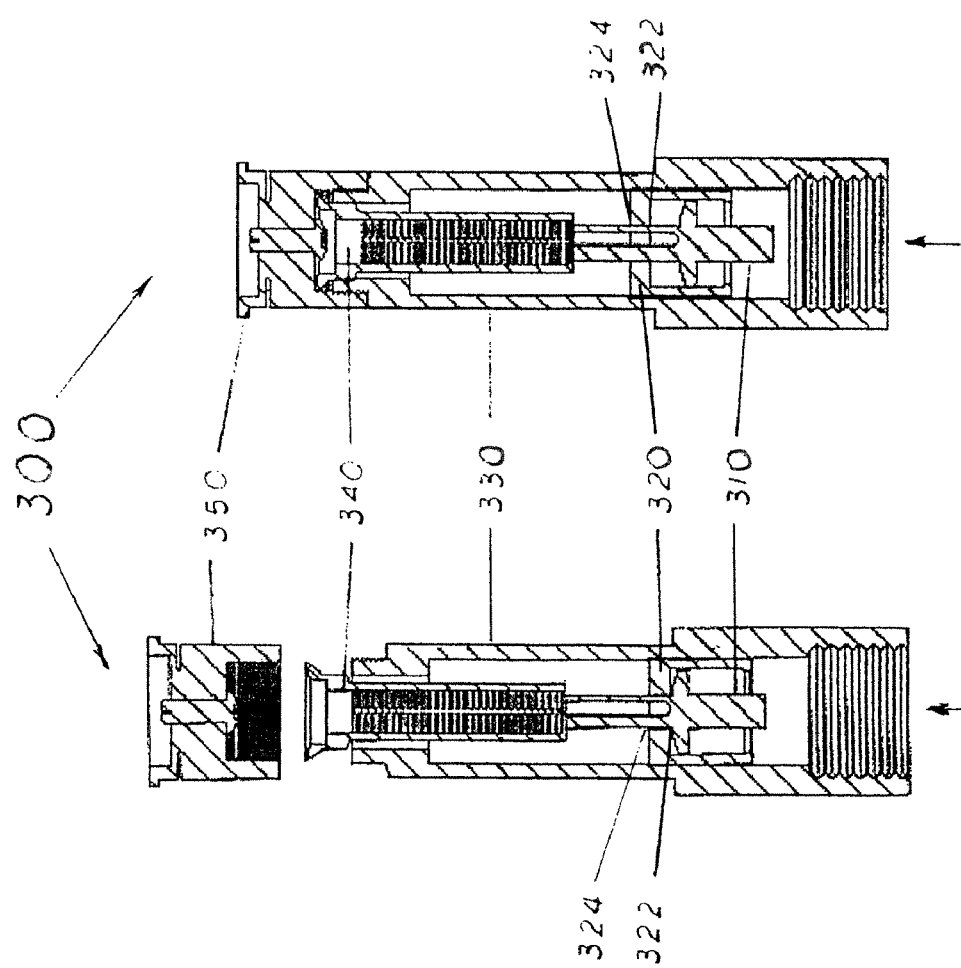

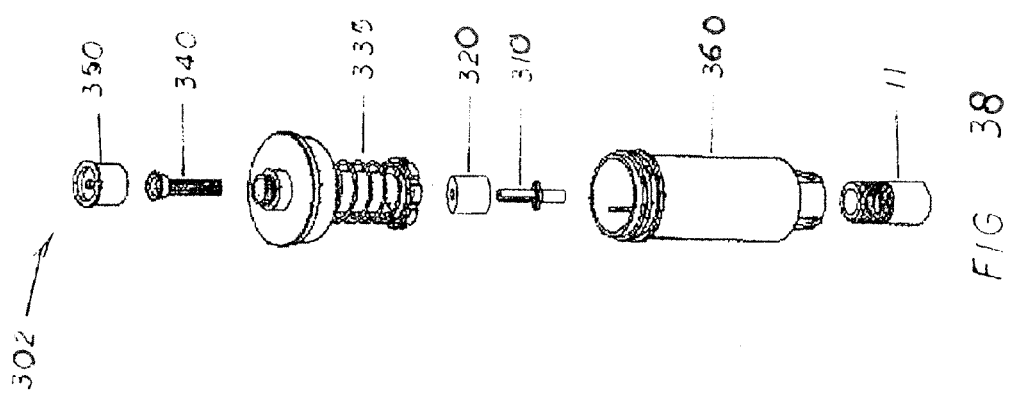
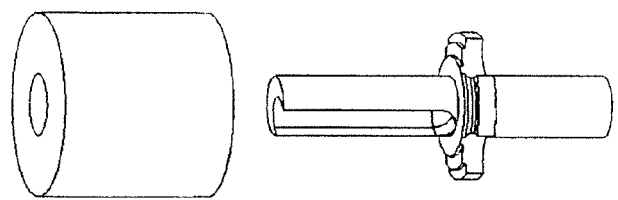
FIG. 38

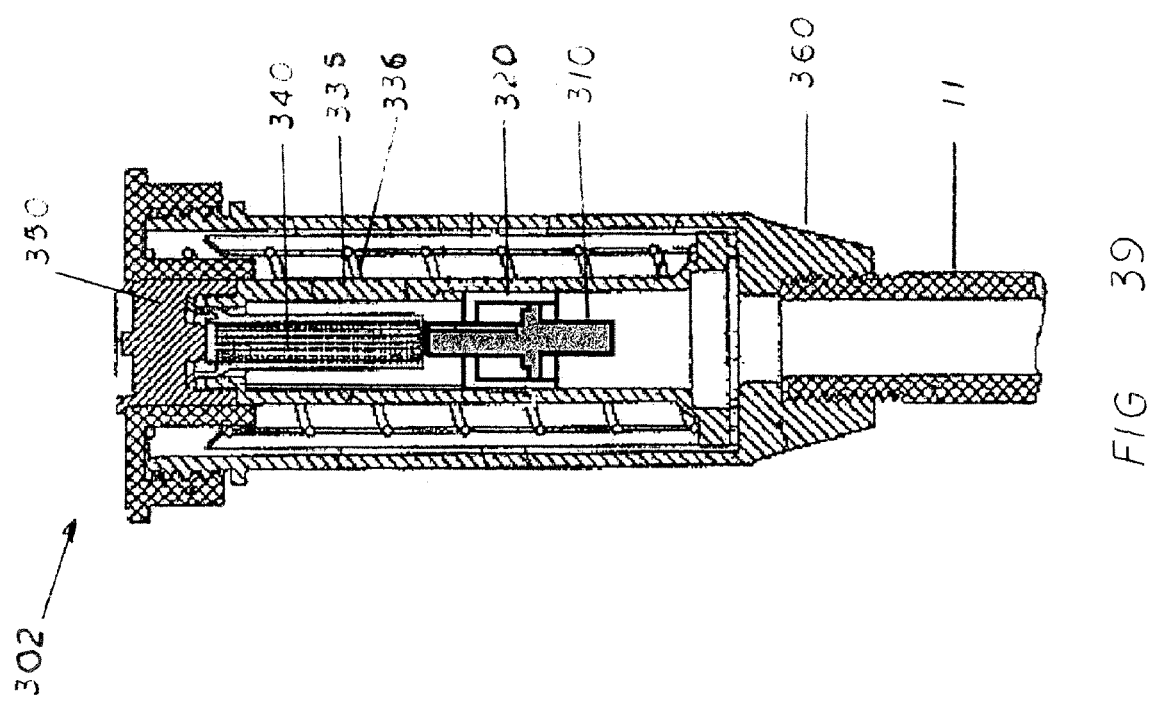

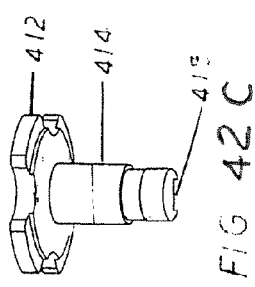
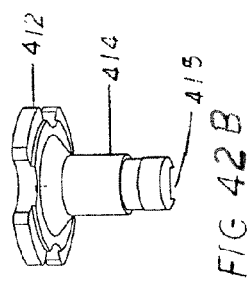
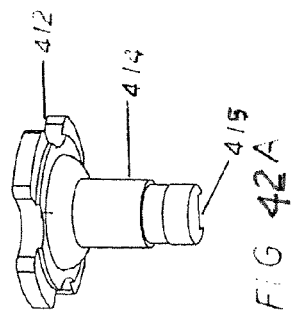
FIG 42C   FIG 42B   FIG 42A
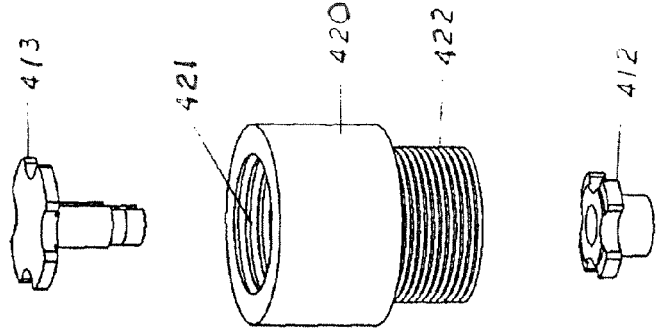
FIG 41
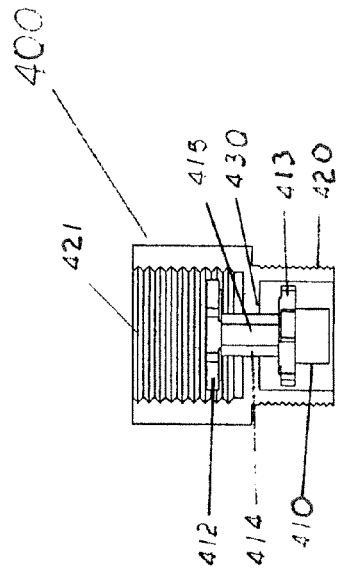
FIG 40B
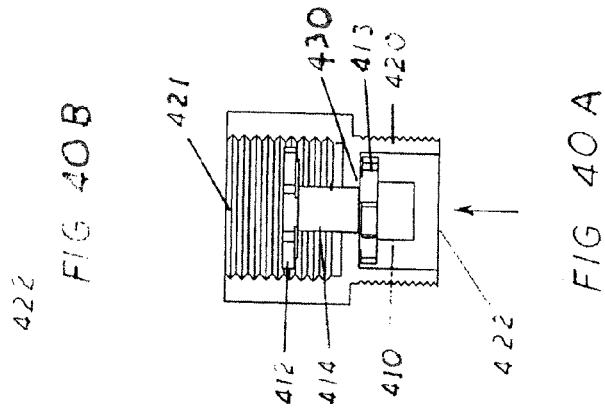
FIG 40A

CHANNELED SHAFT CHECK VALVE ASSEMBLIES

CROSS-REFERENCE TO RELATED APPLICATIONS

This application is a Continuation-In-Part of U.S. patent application Ser. No. 12/361,227 filed Jan. 28, 2009 now abandoned, which is a Continuation-In-Part of U.S. patent application Ser. No. 11/804,690, filed May 18, 2007 now U.S. Pat. No. 7,686,235, which is a Continuation-In-Part of U.S. patent application Ser. No. 11/060,852, filed Feb. 18, 2005, now abandoned, which is a Continuation-In-Part of U.S. patent application Ser. No. 10/973,546, filed Oct. 26, 2004, now U.S. Pat. No. 7,293,721. This application relies on these prior applications for priority and incorporates the specifications and drawings of these prior applications by reference.

FIELD OF THE INVENTION

The present invention relates generally to check valves for use in plumbing or fluid communication devices, and is particularly concerned with check valves for sprinkler heads for all types of irrigation systems.

BACKGROUND OF THE INVENTION

In a sprinkler system, a series of pop-up or fixed sprinkler heads are positioned at spaced intervals over an area to be irrigated, such as a lawn, garden, growing fields on farms, or the like. The sprinkler heads are supplied from a single water source via buried water supply pipes which have spaced outlets connected to the sprinkler heads. If maintenance is required due to a broken or clogged sprinkler head, the entire water supply must be turned off while the maintenance is carried out, then turned on again after the sprinkler head is repaired or replaced. This is inconvenient for the worker.

Since sprinkler heads are located above ground level, they are often accidentally broken. If a sprinkler head is damaged or not in place when the water supply is turned on by an automatic timer, water will gush out of the outlet, resulting in waste of water and potential damage to a lawn or plants in the vicinity.

Check valve devices have been proposed in the past for shutting off water supply to a sprinkler outlet in the event that the sprinkler head is displaced or removed. However, these are of relatively complex design and may be expensive to install.

SUMMARY OF THE INVENTION

It is an object of the present invention to provide a new and improved check valve assembly for a plumbing or fluid communication device such as a pop-up or fixed sprinkler head.

According to one aspect of the present invention, a fluid supply apparatus such as a sprinkler head comprises a conduit having a first end for connection to a fluid supply and an outlet end, an outlet supply head releasably coupled to the outlet end of the conduit, a valve seat within the conduit, the valve seat having a passageway for fluid flow through the valve seat, a valve member comprising a substantially flat disc adjacent the valve seat and movable between an open position allowing fluid flow through the passageway and a closed position sealing the passageway, and a separate actuator mounted in the conduit between the outlet supply head and the valve seat, the actuator having a piston projecting through the passageway in the valve seat to contact the valve member and urge the valve member into an open position when the actuator is in an operative position, the actuator being held in the operative position when the outlet supply head is coupled to the outlet end of the conduit. The arrangement is such that, when the outlet supply head is removed from the outlet end of the conduit or broken off, fluid pressure in the conduit will urge the valve member into the closed position.

In one embodiment of the invention, the valve member is a disc of rubber or similar resilient material. It may have a ring of spaced openings for allowing water to flow through the valve in the open position, with the actuator forcing a central portion of the valve disc away from the seat when in the operative position, so as to space the openings from the seat. When the valve is closed, the openings are positioned against the valve seat and no water flow is possible. In an alternative arrangement, the valve may comprise a flapper valve, with the central portion comprising a flap cut out around part of its periphery and secured to the remainder of the valve by a piece of valve material acting as a hinge. When the actuator is held in the operative position, the flap is urged into an open position. When the actuator is retracted, the flap will be biased back into the closed position by water flowing from the water supply, preventing or restricting water flow to the sprinkler outlet.

The valve member may be formed integrally at one end of the valve seat, or may be a separate disc suitably mounted in the conduit adjacent a first side or end of the valve seat which faces the first end of the conduit. Where the valve member is formed integrally with the valve seat, it may be a disc-shaped flap valve secured to the valve seat via an integral hinge or the like to one side of the passageway. The valve seat may be formed integrally with the conduit, or may be a press fit in the conduit, or alternatively may be suitably secured in the conduit by interengageable formations such as screw threads on the outer surface of the valve seat and inner surface of the conduit.

The actuator may be secured to the end of a sprinkler head or a filter in the sprinkler head, or may be a separate member mounted between the sprinkler head or filter and the valve seat. If the sprinkler head is broken off or removed for maintenance, water flow through the supply pipe will force the valve closed.

The valve seat may be located in an existing sprinkler head pop up stem, or in a separate coupling sleeve for securing between a water supply tube and a sprinkler head housing. In the version using a coupling sleeve, the sleeve may be in two parts, comprising a break-away sleeve on which the sprinkler head is mounted, and an inner sleeve having the valve seat and mounted in a lower end of the break-away sleeve. In this case the actuator is mounted between the break-away sleeve and the valve seat, or may be formed integrally with the break-away sleeve. The break-away sleeve has a line of weakness or an annular V-notch around its perimeter at an appropriate point, and will tend to break at this point in the event of any impact which would otherwise tend to break off the sprinkler head. Once the break-away sleeve is broken off, the actuator is released and the biasing force of water on the valve will force the valve into the closed position. If the actuator is formed integrally with the break-away sleeve, it will be broken off together with the sleeve in the event of an impact, so that the valve can be forced shut.

A small orifice may be provided at the center of the valve. This will allow a small stream of water to exit the valve assembly when the valve is closed, facilitating cleaning of a screen filter if used in the assembly. Another advantage of a small central orifice in the valve is that a trickle of water will be seen after a sprinkler head has been broken off, indicating to operators that the sprinkler needs to be repaired at that location. It is otherwise difficult to determine when sprinkler heads are broken, particularly in a large irrigation area.

In another embodiment of the invention, a check valve assembly is designed for mounting in a standard pipe coupling or joint having two threaded ends for receiving the ends of two pipes or a fluid supply pipe and an outlet device. The check valve assembly comprises a valve seat having external threads for threaded engagement in one threaded end of a standard pipe coupling, a disc valve secured to one end of the valve seat by a hinge and an actuator for movable mounting on the opposite side of the valve seat, the actuator having a piston extending through the valve seat to contact the disc valve. The check valve assembly is mounted in the pipe coupling such that the disc valve is facing the fluid supply pipe when the coupling is secured between two pipe ends. The second pipe or a sprinkler head secured to the coupling urges the actuator into an operative position in which the piston engages the valve disc and pushes it into an open position. If the second pipe or other outlet device is removed, incoming water pressure at the opposite end of the coupling will urge the disc valve into the closed position and displace the actuator into a retracted, inoperative position.

The check valve assembly of this invention can be readily installed in any sprinkler system with pop-up or fixed sprinkler heads, simply by connecting the coupling sleeve between the water supply and the base of the sprinkler head, or by mounting the valve assembly directly in an existing sprinkler head pop up stem. The check valve is arranged to close automatically if the sprinkler head is removed for maintenance and to re-open when the sprinkler head is replaced. No separate biasing means is required to urge the check valve into the closed position. Instead, the check valve is a disc valve which is urged away from the valve seat by the actuator. The disc valve will be urged into the closed position by water pressure at the water supply outlet or riser on release of the actuator by the sprinkler head. In a solid set sprinkler system, where there is a malfunctioning sprinkler, the check valve assembly of this invention allows the malfunctioning sprinkler to be repaired or replaced without shutting down the entire system.

In another embodiment of the invention a channeled shaft check valve assembly includes a conduit having an inlet end for connection to a pressurized fluid supply and an outlet end, and an outlet fixture releasably coupled to the outlet end of the conduit. A sleeve is mounted within the conduit and has an internal valve seat with a central opening for fluid flow. An actuating member is contained inside the conduit between the outlet fixture and the valve seat. A valve member is mounted within the sleeve, and includes a disc on the opposite side of the valve seat from the outlet end of the conduit and a channeled shaft extending outward from the center of the disc and through the central opening in the internal valve seat. The valve member is movable between an open position with the disc unseated from the valve seat allowing fluid flow along the channeled shaft and through the central opening in the valve seat and a closed position with the disc seated against the valve seat by pressurized fluid in the conduit When the outlet fixture is coupled to the outlet end of the conduit, the actuating member contacts the channeled shaft of the valve member and urges the valve member away from the valve seat and into the open position, and wherein when the outlet fixture is removed from the outlet end of the conduit, the pressurized fluid urges the valve member into the closed position with the disc seated against the valve seat.

In various embodiments, the actuating member may be a filter element. However, it may also be a dedicated actuating member with no function other than to actuate the valve. Whether or not the actuating member is a filter, it may or may not be integral with the outlet fixture. In some embodiments the actuating member is completely separate from the outlet fixture, and they may or may not engage or interconnect with one another.

The disc of the valve member preferably comprises an outer periphery with at least one channel or at least one opening to promote fluid flow. In some embodiments the valve member may further include a second disc mounted on the channeled shaft on the same side of the valve seat as the outlet fixture.

In another embodiment, a channeled shaft check valve assembly includes a conduit having an inlet end for connection to a pressurized fluid supply and an outlet end, and an outlet fixture releasably coupled to the outlet end of the conduit. There is a valve seat inside the conduit, the valve seat having a central opening for fluid flow, and a valve member mounted within the conduit. The valve member has a first disc on the opposite side of the valve seat from the outlet end of the conduit, a channeled shaft having a first end connected to the first disc and a second end extending through the central opening in the valve seat, and a second disc mounted to the second end of the channeled shaft and on the same side of the valve seat as the outlet end of the conduit. The valve member is movable between an open position with the first disc and the second disc both unseated from the valve seat allowing fluid flow along the channeled shaft and through the central opening in the valve seat, a first closed position with the first disc seated against the valve seat by pressurized fluid in the conduit, and a second closed position with the second disc seated against the valve seat in the absence of pressurized fluid in the conduit. When the outlet fixture is coupled to the outlet end of the conduit, the outlet fixture urges the first disc of the valve member away from the valve seat and into the open position When the outlet fixture is removed from the outlet end of the conduit, the pressurized fluid urges the first disc of the valve member into the closed position with the first disc seated against the valve seat.

The valve seat may be formed in the conduit itself, or it may be formed inside a sleeve which is inserted into the conduit between the inlet end and the outlet end. The assembly may also include an actuating member disposed between the outlet fixture and the valve seat, so that when the outlet fixture is coupled to the outlet end of the conduit, the outlet fixture urges the actuating member against the valve member to urge the first disc of the valve member away from the valve seat and into the open position. However, there may also be no separate actuating member, so that a portion of the outlet fixture directly contacts and urges the valve member. Where an actuating member is present, it may be a filter element.

BRIEF DESCRIPTION OF THE DRAWINGS

These and other features of the invention are described in further detail in the following description and will be better understood with reference to the accompanying drawings, which are briefly described below.

FIG. 4 is a perspective view of a modified check valve, on an enlarged scale;

FIG. 5 is a view similar to FIG. 2 but showing the check valve of FIG. 4 installed in the assembly with the valve in an open position;

FIG. 6 is a view similar to FIG. 5, showing the valve in a closed position;

FIG. 7 is an exploded view of a sprinkler head apparatus incorporating a check valve assembly according to a third embodiment of the invention;

FIG. 8 is a vertical cross-section through the assembled sprinkler head apparatus, showing the check valve in the open position;

FIG. 9 is a view similar to FIG. 8 but showing the check valve in the closed position;

FIG. 10 is a perspective view illustrating a modified actuator for use in the check valve assembly;

FIG. 11 is a vertical cross-section through an assembled sprinkler head and check valve assembly using the modified actuator of FIG. 10;

FIG. 23 is an exploded view of the components of the sprinkler head apparatus and check valve assembly of FIG. 22;

FIG. 25 is a perspective view of an alternative integral valve seat and valve member used in the check valve assembly of FIG. 24;

FIG. 26 illustrates an alternative filter and actuator arrangement for the embodiments of FIGS. 22 to 25;

FIG. 35 shows an exploded view of a channeled shaft check valve assembly according to another embodiment of the present invention, in which the check valve member includes a channeled shaft.

FIG. 36 shows a close up view of the valve member and sleeve in the embodiment of FIG. 35.

FIG. 37A shows a sectional view of the channeled shaft check valve assembly of FIG. 35, with the outlet fixture removed and the valve member in the closed position.

FIG. 37B shows a sectional view of the channeled shaft check valve assembly of FIG. 35, with the outlet fixture attached and the valve member in the open position.

FIG. 38 shows an exploded view of a channeled shaft check valve assembly installed in a pop up sprinkler head.

FIG. 39 shows a sectional view of the channeled shaft check valve assembly of FIG. 38, with the valve member in the open position.

FIG. 40A shows a channeled shaft check valve assembly according to another embodiment of the present invention, shown in the closed position.

FIG. 40B shows the channeled shaft check valve assembly of FIG. 40A in an open position.

FIG. 41 shows an exploded view of the channeled shaft check valve assembly of FIGS. 40A and 40B.

FIGS. 42A, 42B and 42C show alternative versions of the valve member of FIGS. 40A and 40B.

DETAILED DESCRIPTION

Exemplary embodiments of the invention are described in detail below with reference to the appended figures, wherein like elements are referenced with like numerals throughout. The figures are not necessarily drawn to scale and do not necessarily show every detail or structure of the various embodiments of the invention, but rather illustrate exemplary embodiments and mechanical features in order to provide an enabling description of such embodiments.

Figure 1A:
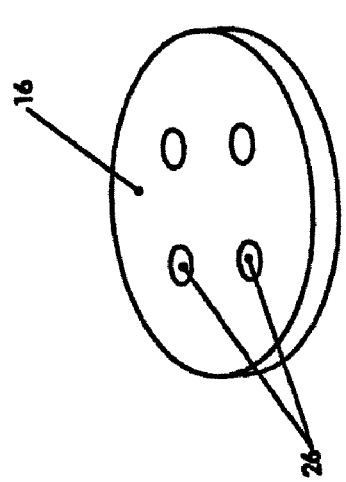
FIG. 1A is an enlarged perspective view of the check valve.
Figure 1:
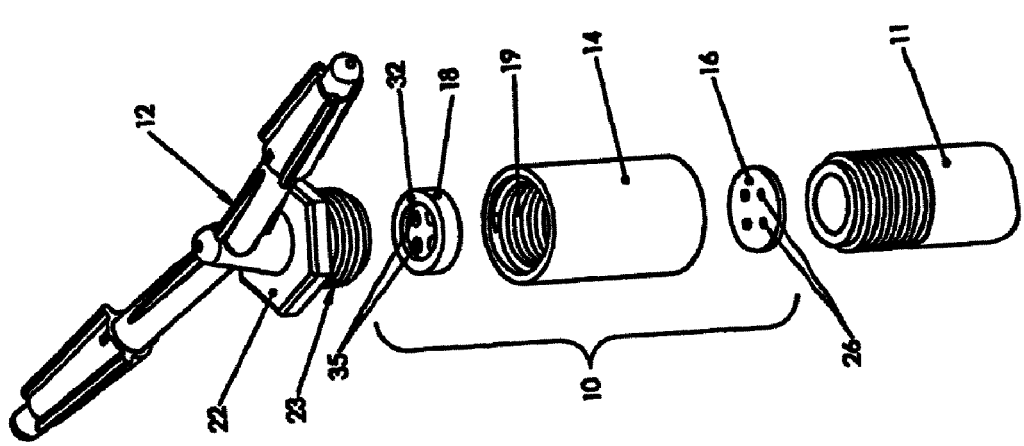
FIG. 1 is an exploded view of a sprinkler head apparatus incorporating a check valve assembly according to a first embodiment of the invention.
Figure 2:
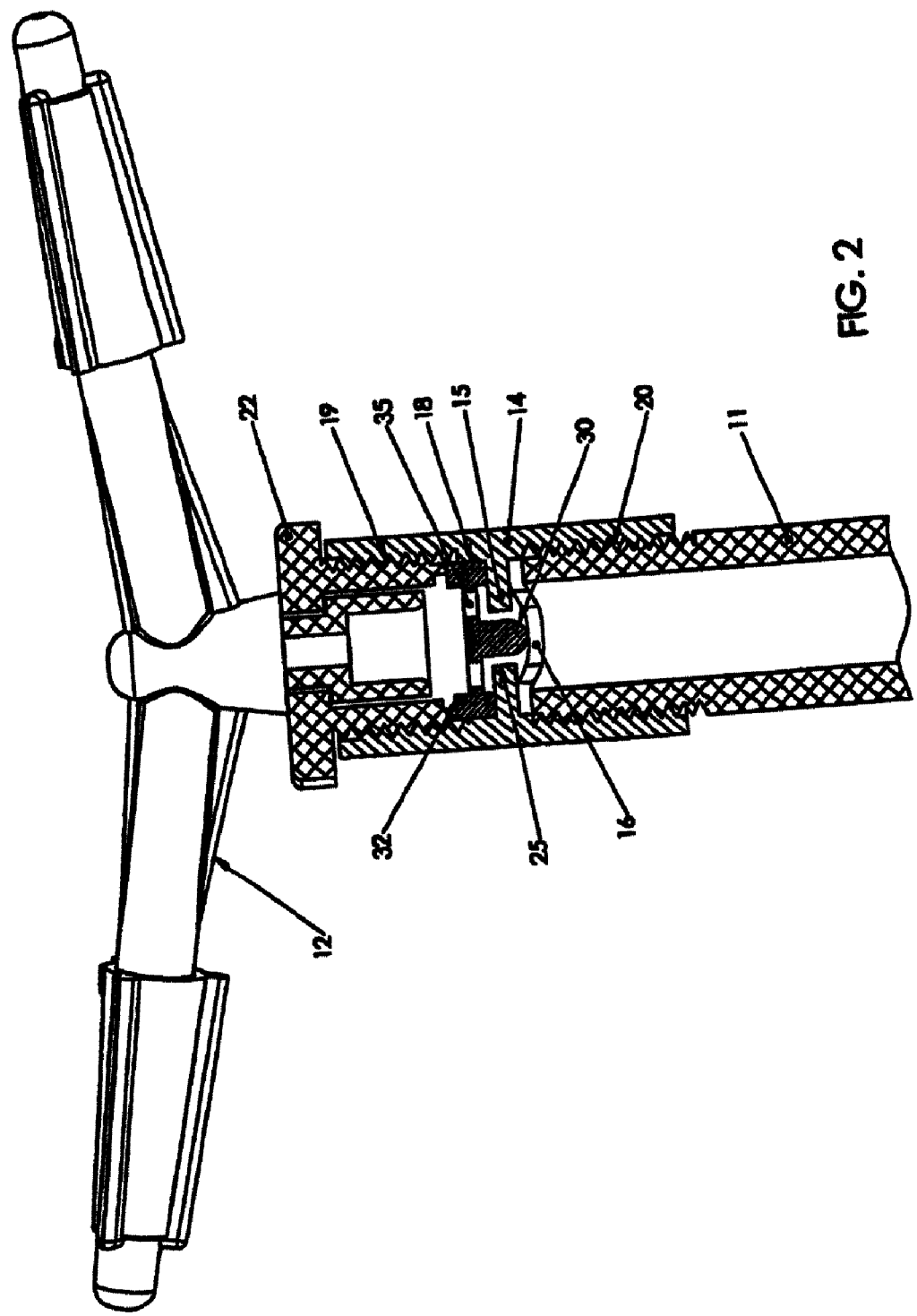
FIG. 2 is a vertical cross-section through the sprinkler head and check valve assembly, showing the valve in an open position.
Figure 3:
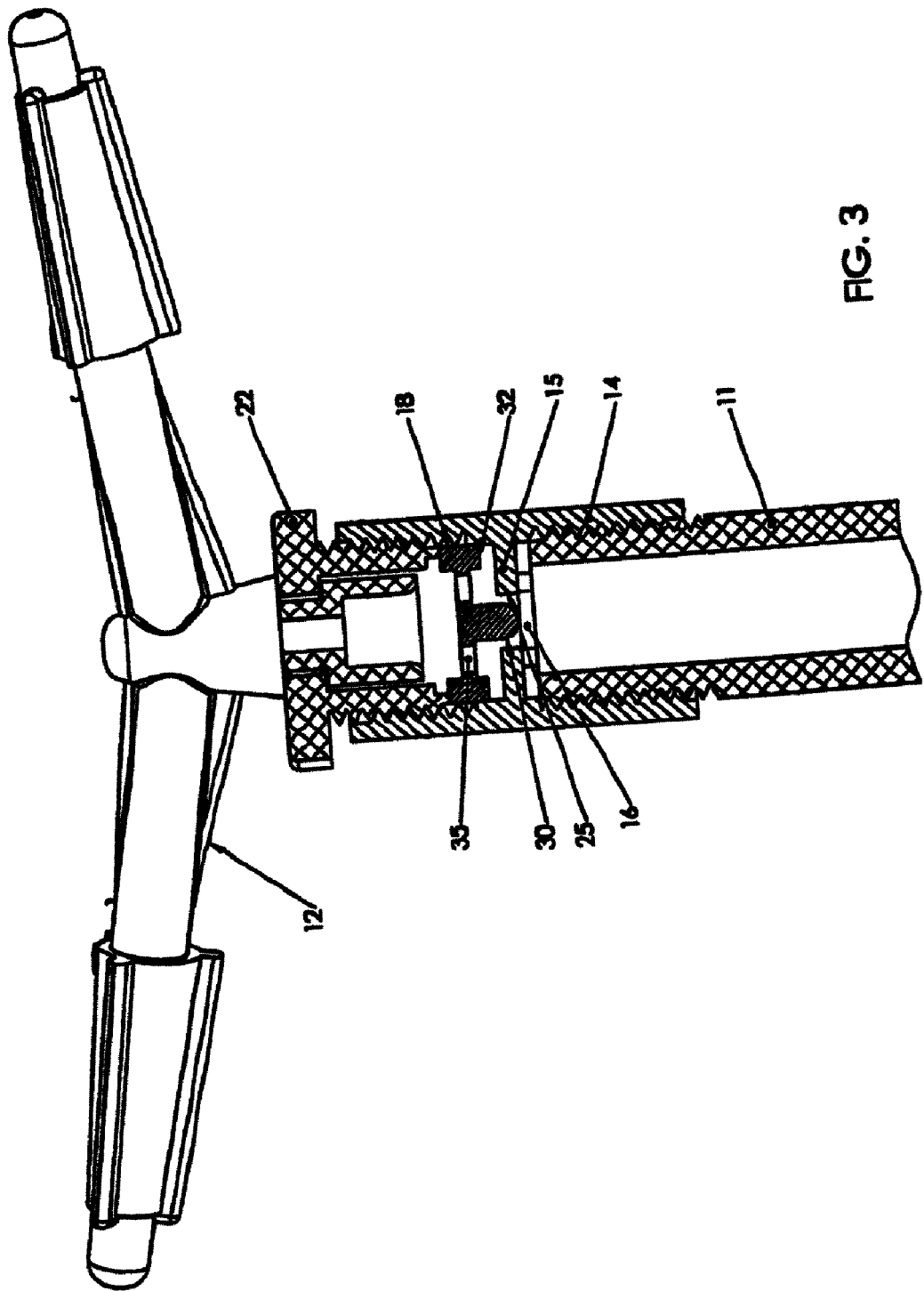
FIG. 3 is a view similar to FIG. 2, showing the valve in a closed position.

FIGS. 1 to 3 of the drawings illustrate a sprinkler head apparatus incorporating a check valve assembly 10 for mounting between a water supply outlet or riser 11 and a pop-up or fixed sprinkler head 12. The check valve assembly 10 basically comprises a coupling sleeve 14 having an internal, annular valve seat or shoulder 15 at an intermediate point in its length, a check valve 16 comprising a flexible disc of rubber or other suitable material mounted beneath the valve seat, and an actuator 18 movably mounted above the valve seat.

The coupling sleeve 14 in the illustrated embodiment has a first set of internal screw threads 19 extending from its upper end and terminating short of the valve seat 15, and a second set of internal screw threads 20 extending from its lower end towards the valve seat 15. The threaded ends of the coupling sleeve 14 are designed for connection to the base 22 of a sprinkler head having external threads 23, and the upper end of a riser or water supply tube 11 of a sprinkler system, as best illustrated in FIGS. 2 and 3. It will be understood that any suitable attachment devices may be provided for securing the coupling sleeve between a sprinkler head and base, and one or both ends may have external rather than internal threads, or other fastener mechanisms.

The valve seat 15 has a central opening 25 over which a central portion of the check valve extends in the closed position. The check valve 16 is a thin disc of flexible material, as noted above, and has a series of spaced openings 26 spaced outwardly from the central region of the disc. The central region of the valve is aligned with the seat opening 25 when the valve is mounted in the coupling sleeve as indicated. When the valve is in the closed position of FIG. 3, the openings 26 will be located against the seat 15 and sealed shut. The valve is seated between the upper end of riser 11 and the valve seat, so that the riser 11 must be screwed into the lower end of the coupling sleeve until it bottoms out against the check valve in order to hold it in place.

The actuator 18 is also comprises a disk-like member. An actuator piston or pin 30 extends axially from the center of one face of the disk towards the valve seat and check valve (see FIGS. 2 and 3). Actuator 18 has an upstanding, annular peripheral rim 32 on each face of the disk. A plurality of spaced openings 35 are provided in the disk around the piston or pin 30. The actuator 18 is slidably mounted in the coupling sleeve 14 above the valve seat, and is normally retained between the lower end of the sprinkler head base 22 and the valve seat 15 when the parts are properly assembled as in FIG. 2.

When the riser 11 is fully engaged in the threaded lower end of the sleeve 14, it will hold the outer rim of the check valve 16 against the valve seat. At the same time, when the sprinkler head is fully engaged in the threaded upper end of the coupling sleeve, it will urge the actuator 18 downwardly into the operative position of FIG. 2, in which the piston 30 bears against the central portion of the valve disk 16 and pushes it downwardly, away from the opening 25 in the valve seat. This allows water to flow to the sprinkler head through the openings 26 in the check valve, the opening 25 in the valve seat, and the openings 35 in the actuator.

If the sprinkler head is removed from the coupling sleeve 14 for any reason, for example for replacement or maintenance, the actuator 18 will be released, and water pressure in the riser or supply pipe 11 will force the center of the check valve upwardly into the closed position, as illustrated in FIG. 3. At the same time, the actuator 18 is pushed upwardly into the retracted or inoperative position. When the sprinkler head is replaced and screwed down into the fully engaged position, the actuator 18 will be pushed back down, forcing the valve back into the open position.

FIG. 4 illustrates a modified check valve 40 which may be used in place of valve 16, while FIGS. 5 and 6 illustrate the valve 40 installed in the check valve assembly of the previous embodiment. All other parts of the apparatus in FIGS. 5 and 6 are identical to those of FIGS. 1 to 3, and like reference numerals have been used as appropriate.

The check valve 40 is a flapper valve and may be of flexible or semi-rigid material. As in the previous embodiment, the valve 40 is a generally disc-shaped member. As best illustrated in FIG. 4, a slit 42 is cut out in a circular direction around the center of the valve 40 so as to form a circular flap 44 which is secured to the remainder of the valve by a small web or connecting portion 45 which acts as a hinge. A small central opening or orifice 48 may be provided in flap 44.

In this embodiment, the actuator pin or piston 30 will push the flap 44 down and into the open position when in the operative or extended position of FIG. 5, i.e. when the sprinkler head is properly installed and in position for operation, such that the lower end of base 22 pushes the actuator 18 into the operative position. When the sprinkler supply is turned on, water can then flow past the flap, through the valve and valve opening, and through the openings 35 of the actuator to the sprinkler head. If the sprinkler head is removed for replacement or maintenance, pressure of water in the riser will force the actuator 18 upwardly into the retracted position and the flap 44 back into the closed position, as illustrated in FIG. 6.

The opening or orifice 48 in the flap valve 40 will help an operator to find the location for installation of a replacement sprinkler head or repaired sprinkler head. When the valve 40 is closed by water pressure but no sprinkler head is in place, a small trickle of water will escape through orifice 48, indicating the location of the missing sprinkler head.

Rather than having a separate actuator, as in the preceding embodiments, the actuator may be mounted on the sprinkler base or secured on the end of a filter in the sprinkler, if one is present. Alternatively, the actuator may comprise a piston or projection 55 formed integrally on the end of a sprinkler valve filter 56, as illustrated in FIGS. 7 to 9. The coupling sleeve 58 is elongated in this case, and includes a threaded upper portion 59 for receiving the base 22 of the sprinkler head, a cylindrical intermediate portion 60 for receiving the filter 56, and a valve seat 62 separating the intermediate portion 60 from lower threaded portion 64 which engages with the upper end of the water supply pipe or riser 11. A flap valve 40 as in the previous embodiment is mounted below valve seat 62, but this may be replaced with a rubber gasket valve 16 as in the first embodiment.

The valve will operate in exactly the same way as the previous embodiments, with the piston or projection 55 extending through the opening 65 in the valve seat and pushing the flap 44 of valve 40 into the open position when the sprinkler head is properly mounted, as illustrated in FIG. 8. When the sprinkler head, along with the attached filter, is removed from the coupling sleeve for repair, cleaning, or replacement when broken, the actuator piston is also removed, so that water pressure will push the check valve closed, as indicated in FIG. 9.

FIG. 10 illustrates a modified actuator 70 which may be used in place of the actuator in the embodiments of FIGS. 1 to 6, while FIG. 11 illustrates actuator 70 in place of the actuator 18 in the embodiment of FIGS. 4 to 6. Other parts in FIG. 11 are identical to those of FIGS. 4 to 6, and like reference numerals have been used for like parts as appropriate. Actuator 70 has a body which is generally cross-shaped in cross-section, as best illustrated in FIG. 10, and has four perpendicular flanges or wings 72 instead of a flat disc with openings as in the previous embodiments. An actuator pin or piston 74 projects from the center of the cross shaped body.

FIG. 11 illustrates the actuator 70 mounted between the end of sprinkler head base 22 and the valve seat 15, so that the piston 74 projects through the opening 25 in the valve seat and pushes the valve flap 44 into the open position. If the sprinkler head is removed for replacement or repair, water pressure in riser 11 will act on the flap valve to urge the flap 44 closed and push the actuator 70 upwardly into an inoperative position, in the same manner as illustrated above in FIG. 6.

In the above embodiments, the check valve assembly is arranged to close if the sprinkler head is removed to replace a broken spray head or for maintenance, cleaning, or other purposes. In these embodiments, the check valve is not actuated when a spray head is broken. In the embodiment of FIGS.

Figure 12:
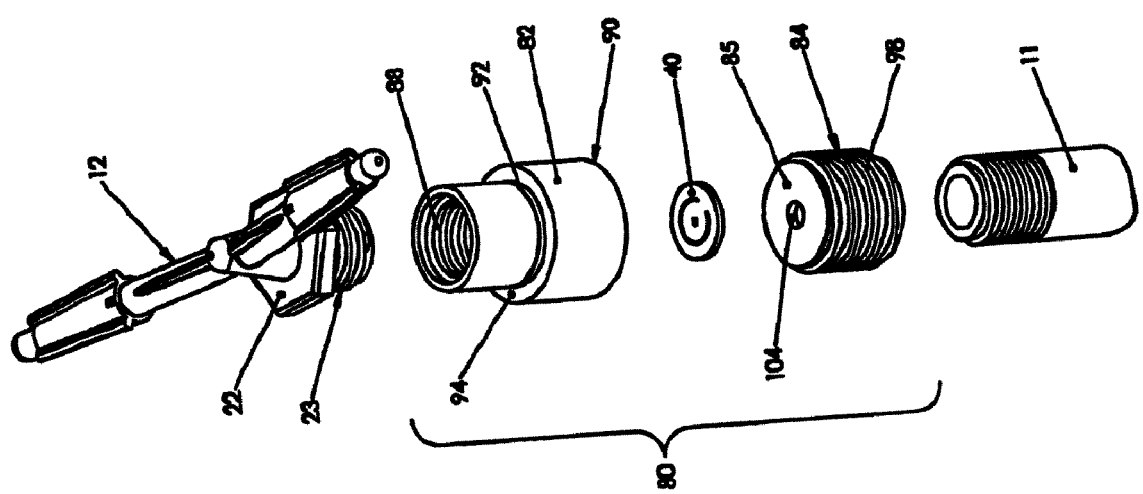
FIG. 12 is an exploded view of a sprinkler head apparatus incorporating a check valve assembly according to another embodiment of the invention.
Figure 13:
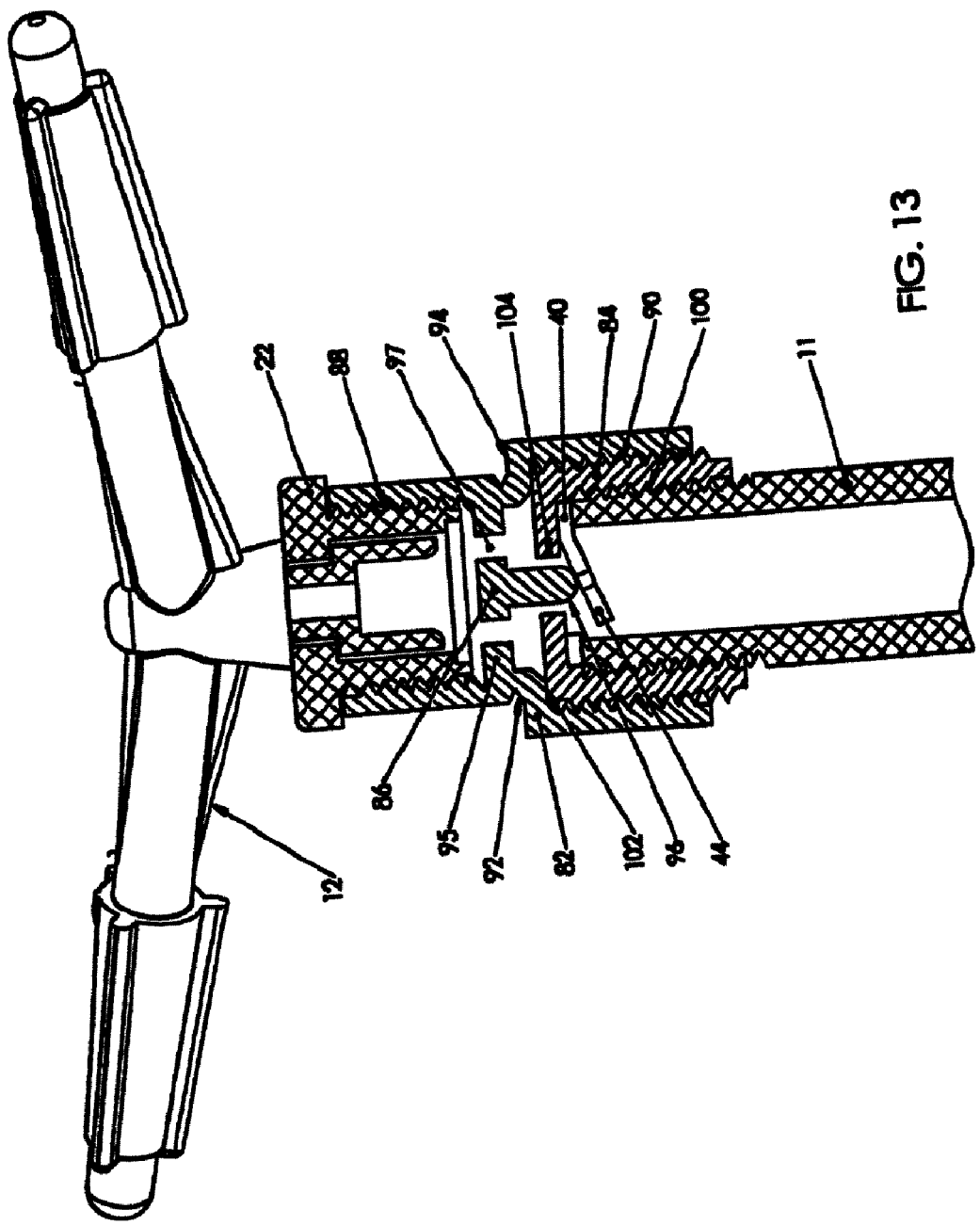
FIG. 13 is a vertical cross-section through the assembled apparatus, showing the check valve in the open position.
Figure 14:
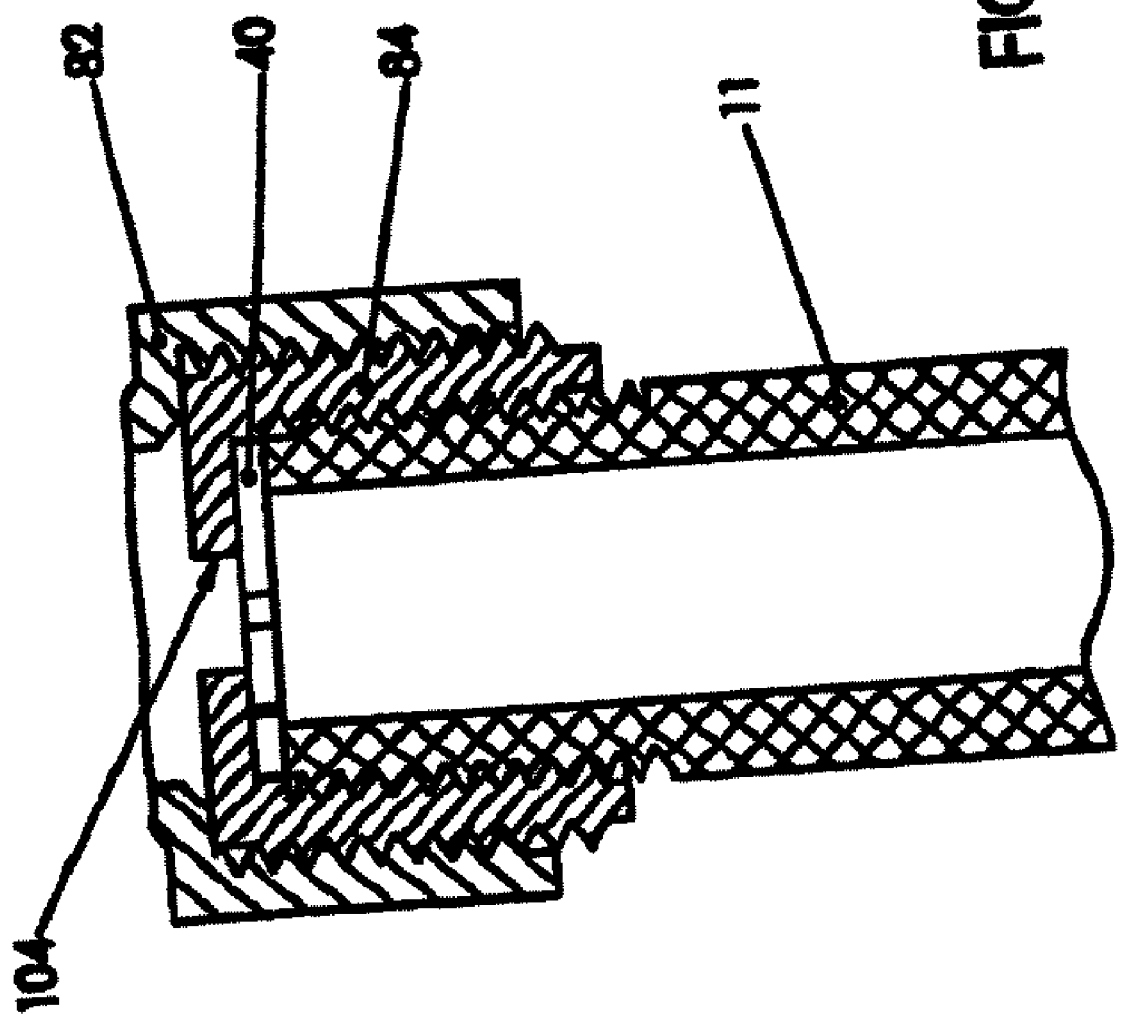
FIG. 14 is a view similar to FIG. 13, illustrating the check valve in the closed position.

12 to 14, a check valve assembly 80 is illustrated which is arranged to cut off water supply to a sprinkler or spray head if the spray head is broken. FIG. 12 illustrates the check valve assembly 80 separate from the water supply outlet or riser 11 and spray head 12, while FIGS. 13 and 14 illustrate the assembly 80 mounted between the water supply outlet and sprinkler head.

The check valve assembly 80 comprises a replaceable outer body or coupling 82, an internal sleeve or nipple 84 on which the valve seat 85 is located, a valve actuator 86 and a disc valve 40 which is identical to the valve 40 of FIGS. 4 to 6. The disc valve 40 may be replaced by a flexible valve 16 with openings 26, as in the first embodiment above. In this embodiment, the valve actuator 86 is formed integrally with the outer body 82, but it may be formed separately in alternative embodiments.

The outer body 82 has an upper threaded portion 88 of smaller outer diameter for releasable engagement with the base 22 of a sprinkler head, and a lower threaded portion 90 of larger outer diameter for releasable engagement with the nipple or internal sleeve 84. An annular V-indent or line of weakness 92 is provided at the lower end of portion 88 adjacent the shoulder 94 which separates the upper portion 88 from the lower portion 90. The valve actuator 86 comprises a wall 95 extending across the internal passageway in the upper portion 88 of the body at a location adjacent and just above the V-indent 92, and a piston or pin 96 extending downwardly from wall 95. Openings 97 are provided in wall 95 for allowing water flow to the sprinkler head.

As illustrated in the drawings, inner body 84 has outer threads 98 for engaging in the lower end portion 90 of the outer body 82 as well as inner threads 100. When the inner body 84 is fully engaged in the lower end portion 90 of the body 82 until it bottoms out against shoulder 102, the piston 96 will extend downwardly through the opening 104 in valve seat 85. The valve 40 is engaged in the inner end of the body 84 and is held in position by the upper end of riser or water supply pipe 11 which is threadably engaged with the internal threads 100 in body 84. When the parts are fully secured together as in FIG. 13, the piston 96 will engage the flap 44 and push it into the open position so that water can flow through the check valve assembly and into the sprinkler head.

In the event of an impact on the sprinkler head, the assembled sprinkler will tend to break off at the V-indent 92, which is the weakest point. This in turn will also break off the actuator 86 so that the water pressure acting on the valve 40 will urge the flap 44 into the closed position, as illustrated in FIG. 14. The water supply is therefore cut off in the event of an impact sufficient to cause breaking of the sprinkler head. This avoids the problem of water gushing out of a broken sprinkler head each time the sprinkler system is turned on. At the same time, the small orifice 48 at the center of valve 40 will allow a small trickle of water to leak out, so that the broken off sprinkler head can be located more easily. Once the break is located, the broken outer body 82 of the check valve assembly can be discarded and replaced with a new outer body 82, and the sprinkler head can be reinstalled.

In the above break-away version of the check valve assembly, the actuator is formed integrally with the outer body 82 which has the break away feature. However, the actuator may alternatively be formed separately, and may be of the structure described above in any of the previous embodiments. In this case, the outer body will be provided with an internal shoulder just above the V-notch, and the actuator will be held in the extended, operative position by the shoulder. If the outer body is broken off at the V-notch, the actuator will be released and the valve urged into the closed position. If the sprinkler head 12 is to be removed for replacement or maintenance, the operator can simply remove the entire outer body 82 with the sprinkler head so that the valve 40 can be urged closed, preventing water from gushing out of the sprinkler supply outlet.

Figure 15:
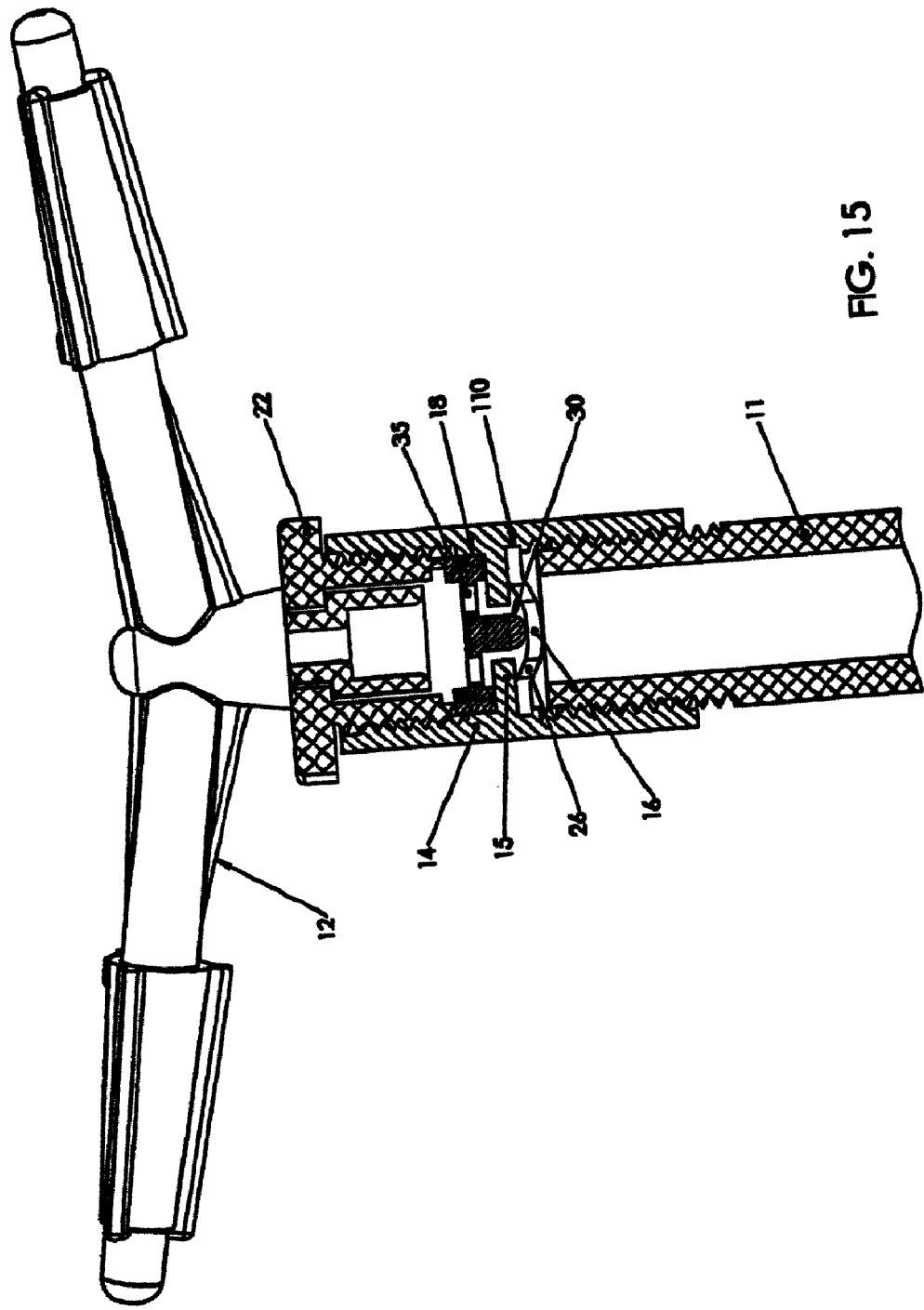
FIG. 15 is a view similar to FIG. 2, illustrating a modified arrangement for mounting the check valve in the embodiment of FIGS. 1 to 3.
Figure 16:
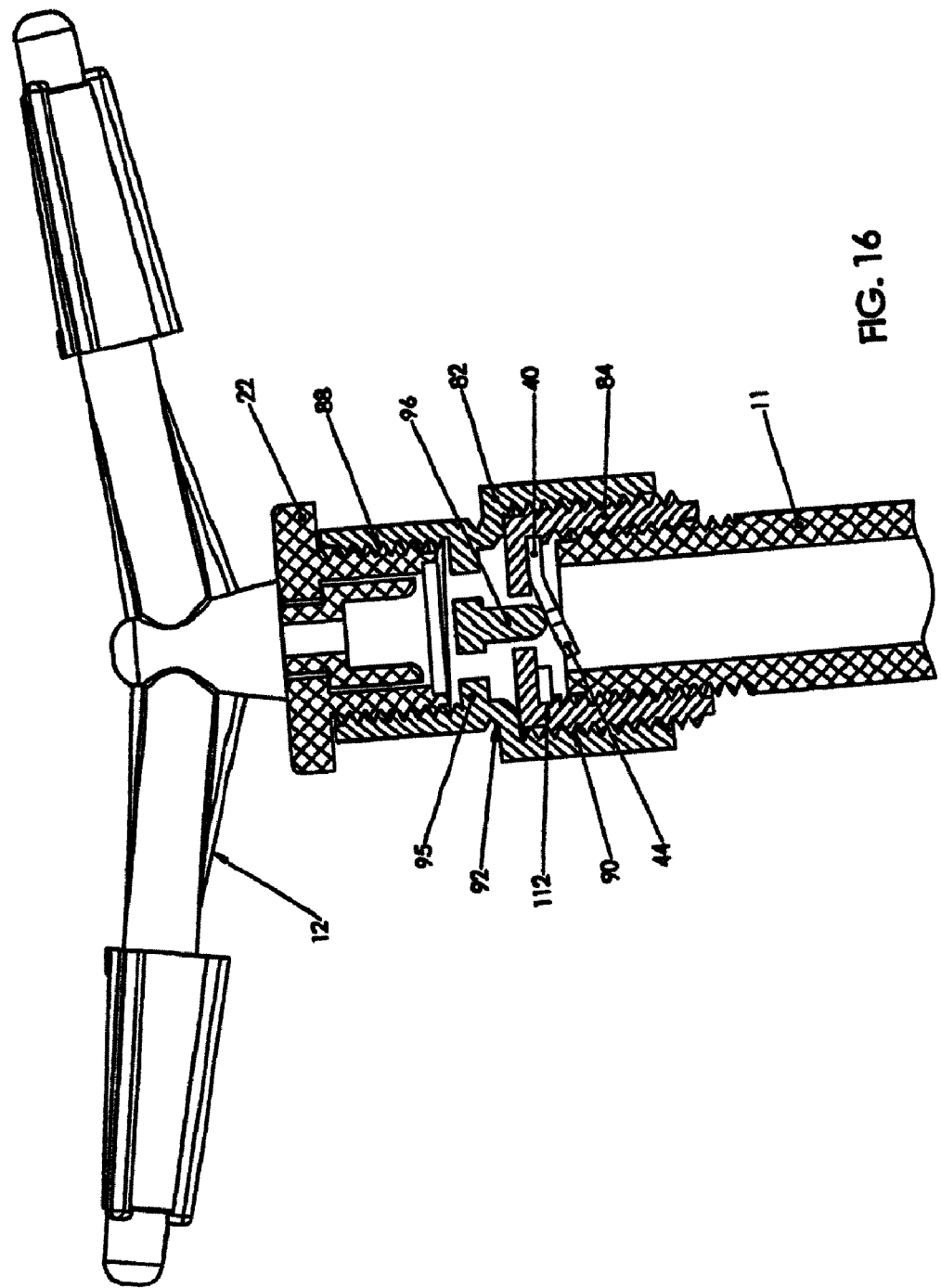
FIG. 16 is a view similar to FIG. 13, illustrating a modification in the mounting arrangement for the check valve of the embodiment of FIGS. 12 to 14.

In each of the above embodiments, the disc valve may be secured beneath the valve seat by the end of the riser or water supply pipe which is threaded into the coupling sleeve. Alternatively, the valve may be retained with a snap-ring or the like, or by the threads in the coupling sleeve, or it may be held in place in an annular groove in the coupling sleeve. FIG. 15 illustrates a modification of the embodiment of FIGS. 1 to 3 in which the valve 16 is of larger diameter and is designed to be snapped into engagement with an annular mounting groove 110 beneath the valve seat 15. In this case, the valve will be securely held in position against the valve seat regardless of whether the riser 11 is fully engaged in the coupling sleeve. The same mounting arrangement for the valve 16 or 40 may be used in any of the previous embodiments. FIG. 16 illustrates a modification of the break away embodiment of FIGS. 12 to 14 where the valve 40 is secured in an annular groove 112 in the inner body or sleeve 84. It will be understood that operation of the check valve will be exactly the same as described in the previous embodiments, with the only difference being the manner in which the valve is mounted in the coupling sleeve.

Figure 17:
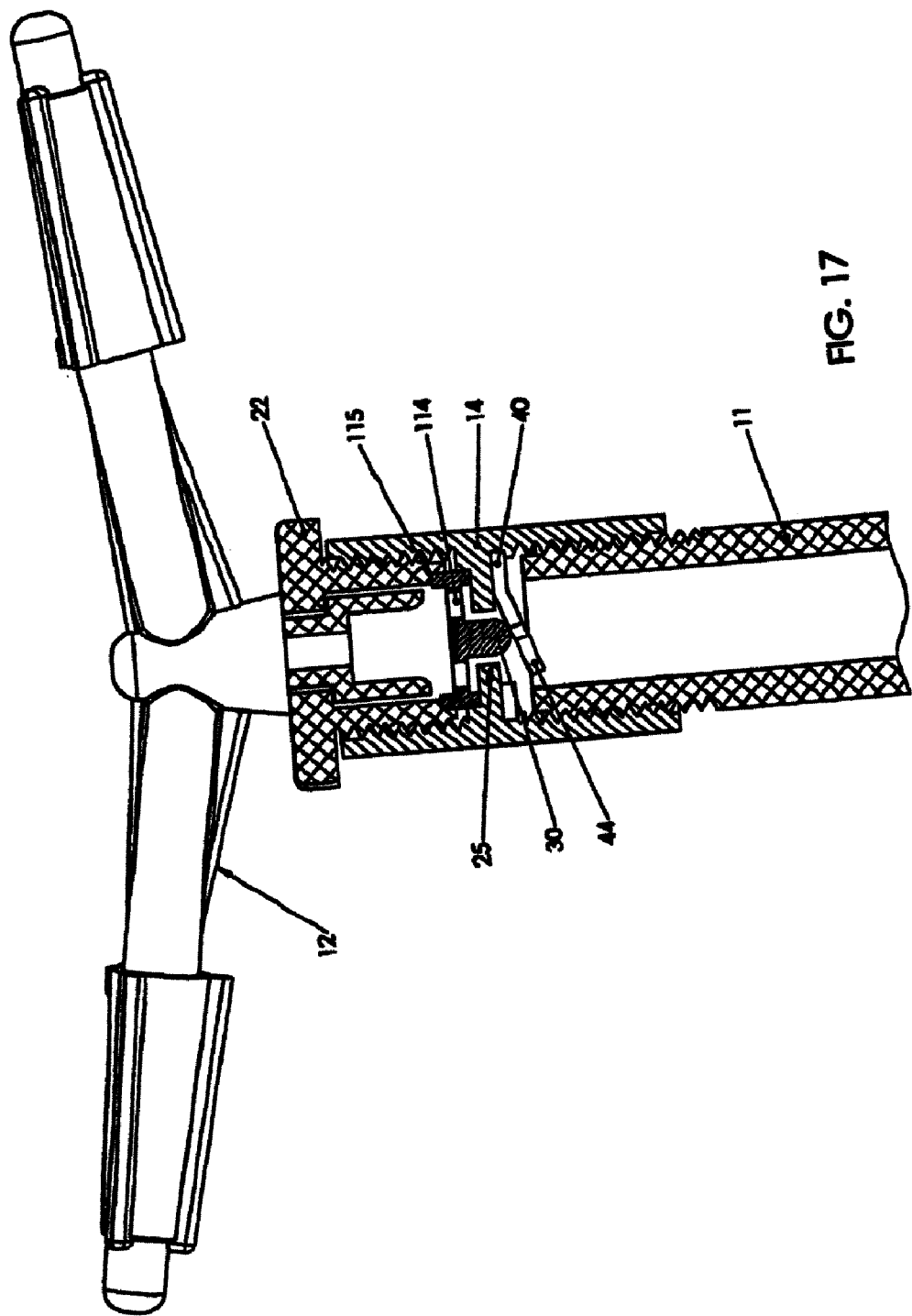
FIG. 17 is a view similar to FIG. 5, illustrating a modified valve and actuator mounting arrangement.
Figure 18:
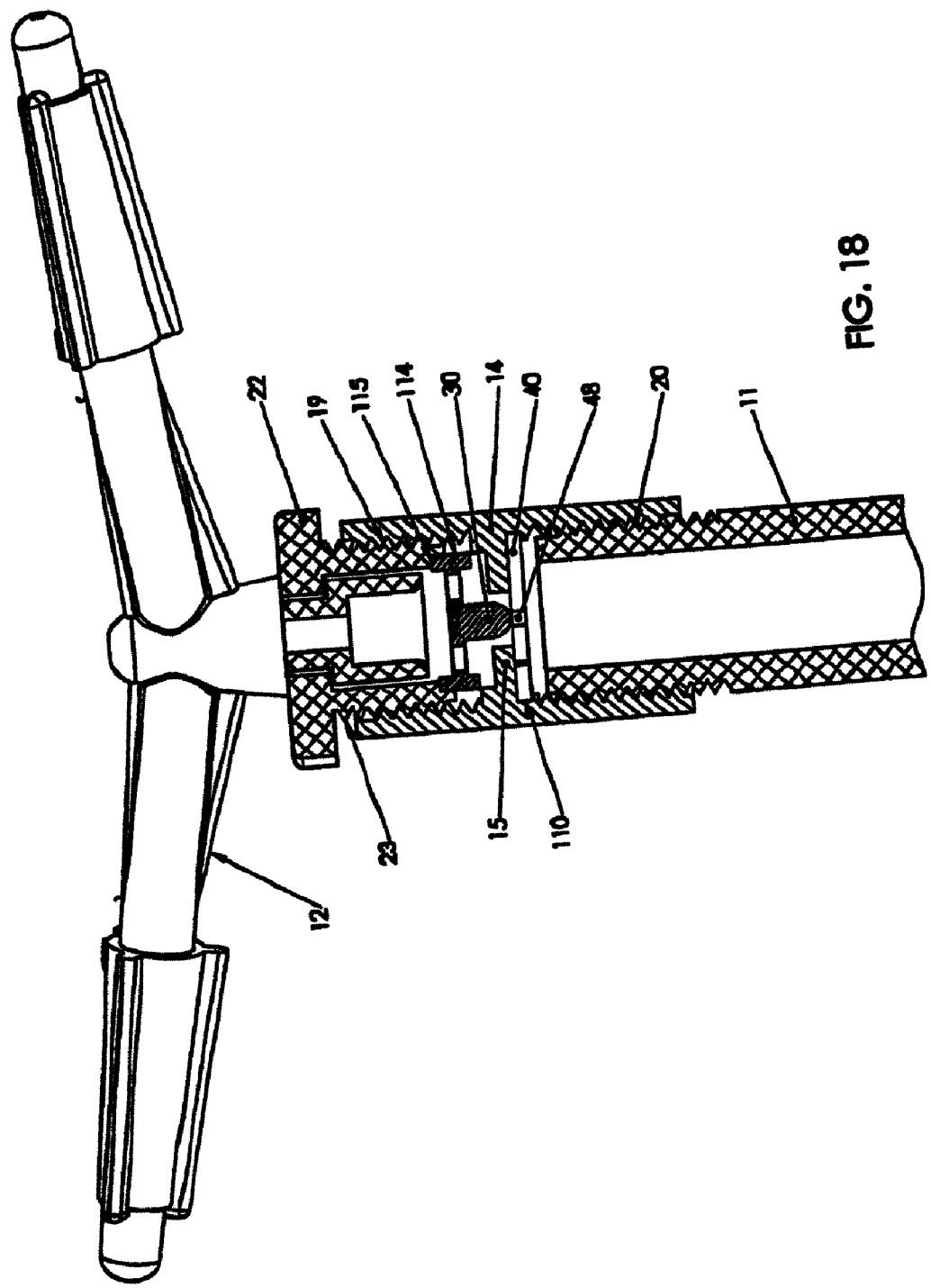
FIG. 18 is a view similar to FIG. 17, illustrating the valve in the closed position and the actuator in a retracted position.

FIGS. 17 and 18 illustrate a sprinkler head apparatus incorporating a check valve assembly which is a modification of the embodiment of FIG. 15. In this embodiment, the actuator 114 is of smaller diameter and is mounted differently from the second embodiment. Other parts are identical to the embodiment of FIGS. 5, 6 and 15, and like reference numerals have been used for like parts as appropriate. As in the embodiment of FIG. 15, the valve 40 in this embodiment is mounted in an annular mounting groove 110 beneath the valve seat in the coupling sleeve 14.

In the embodiments of FIGS. 1 to 6, 10, 11, and 15, the actuator was free floating and was simply trapped between the end of the sprinkler head base 22 and the valve seat 15. In this embodiment, the actuator 114 has its upper rim mounted in a mating seat 115 in the end of the sprinkler head base. The actuator is otherwise of similar structure to actuator 18 in the previous embodiments, and like reference numerals have been used as appropriate.

When the base 22 is fully engaged in the upper end of the coupling sleeve 14, the piston or pin 30 of actuator 114 will extend through the opening 25 in the valve seat and push the valve flap 44 into the open position, as illustrated in FIG. 17. When the sprinkler head is removed for replacement or maintenance, the actuator 114 will be removed along with the sprinkler head, and water pressure in outlet 11 will force the valve flap 44 into the closed position, as indicated in FIG. 18. It will be understood that the actuator may be mounted in a similar manner to that shown in FIGS. 17 and 18 in any of the embodiments of FIGS. 1 to 6, 11, 12, or 15.

Figure 19:
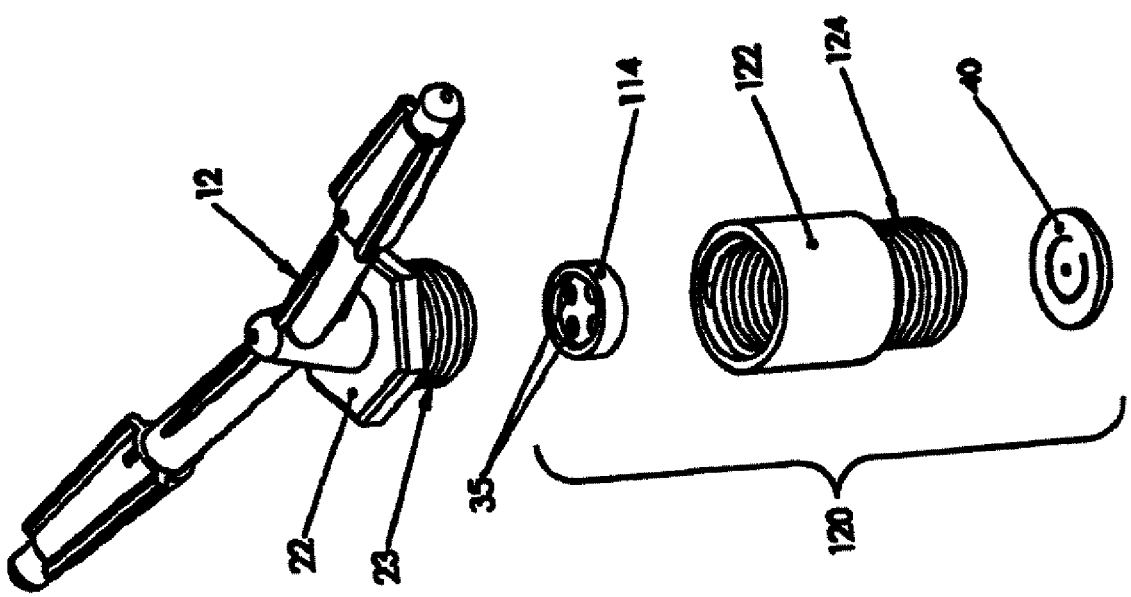
FIG. 19 is an exploded view of a sprinkler head apparatus with a check valve assembly according to another embodiment of the invention.
Figure 20:
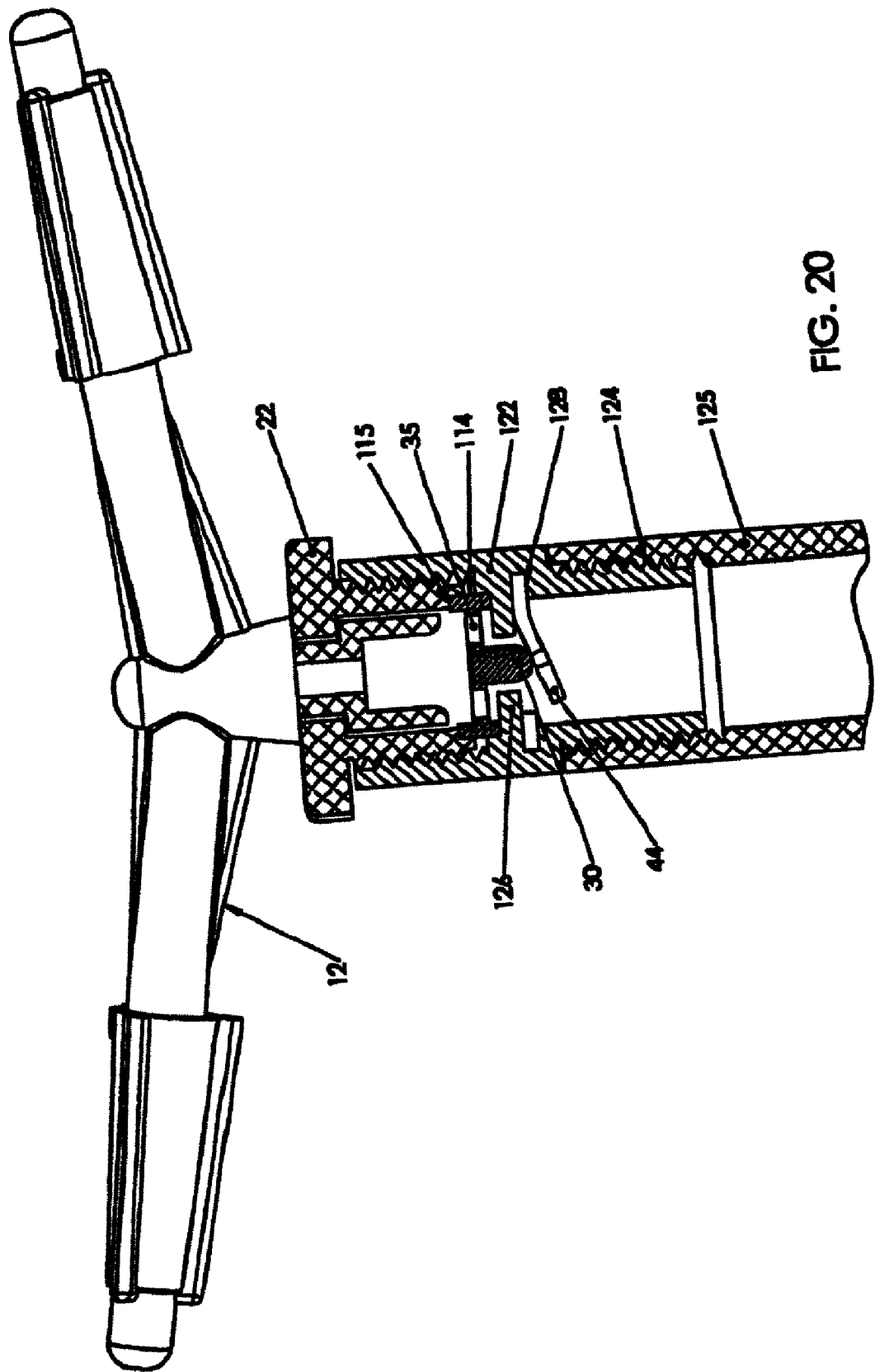
FIG. 20 is a vertical cross-sectional view of the assembled apparatus of FIG. 19, with the valve in the open position.
Figure 21:
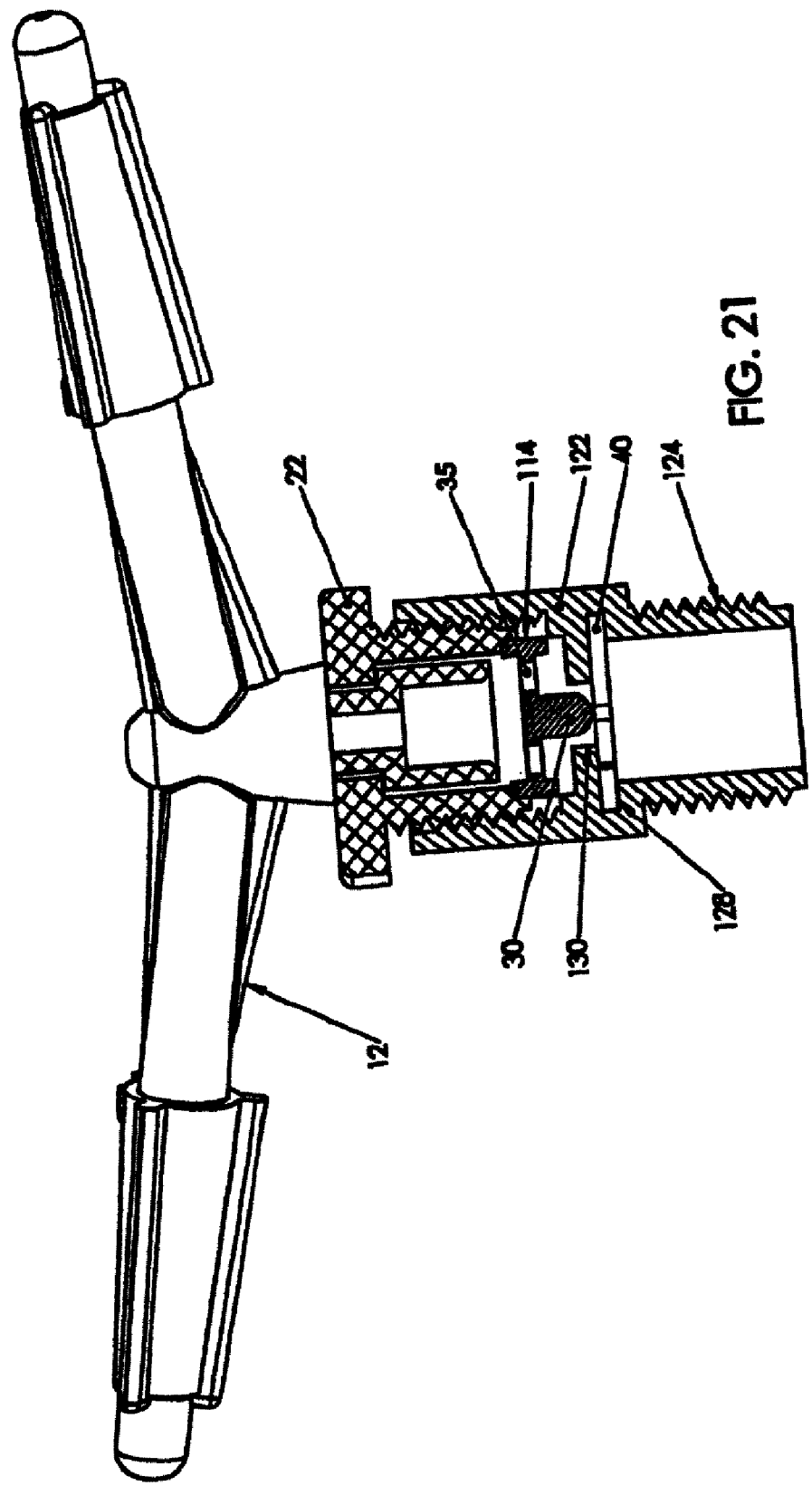
FIG. 21 is a view similar to FIG. 20 illustrating the valve in the closed position.

FIGS. 19 to 21 illustrate a check valve assembly 120 according to another embodiment of the invention for installation with a sprinkler head 12. This embodiment uses an actuator 114 and check valve 40 similar to some of the previous embodiments, but has a modified coupling sleeve or body 122 which has external threads 124 at its lower end, rather than internal threads as in the previous embodiments. This can be used when the riser pipe or water supply outlet 125 has internal threads rather than external threads (see FIG. 20). Although a flap valve 40 is illustrated, it will be understood that this valve may be replaced by a flexible disc valve 16 as in the embodiment of FIGS. 1 to 3 if desired.

As in the first embodiments, the coupling sleeve 120 has an internal valve seat 126 at an intermediate point in its length. Since the water supply outlet or riser 125 does not engage inside the lower end portion of sleeve 120, other means must be used to retain the valve 40 in position adjacent the seat. In this case, an annular mounting groove 128 is provided immediately beneath the seat 126, and the outer rim of valve 40 is seated in groove 128, as indicated in FIG. 20.

The actuator 114 is mounted in the end of the sprinkler head base 22 in a similar manner to the previous embodiment of FIGS. 17 and 18, but it may alternatively be a larger diameter actuator which is freely mounted between the base 22 and valve seat, as in the first two embodiments, or may be mounted on the end of a filter or the like. When the base 22 is fully engaged in the upper end of the coupling sleeve 120, the actuator piston 30 will extend through the opening 130 in the valve seat to push valve flap 44 into the open position, as illustrated in FIG. 20. If the sprinkler head and attached actuator 114 are removed, the water pressure in the water supply pipe 11 will force the flap 44 into the closed position, as illustrated in FIG. 21.

The check valve assembly of the previous embodiments can be readily installed in any sprinkler system with pop-up or fixed sprinkler heads, simply by connecting the coupling sleeve between the water supply and the base of the sprinkler head. In a number of the embodiments, the check valve is arranged to close automatically if the sprinkler head is removed for maintenance and to re-open when the sprinkler head is replaced. In other embodiments, the check valve closes automatically if the sprinkler head is broken, as in the embodiment of FIGS. 12 to 14, as well as when the sprinkler head is removed.

Figure 22:
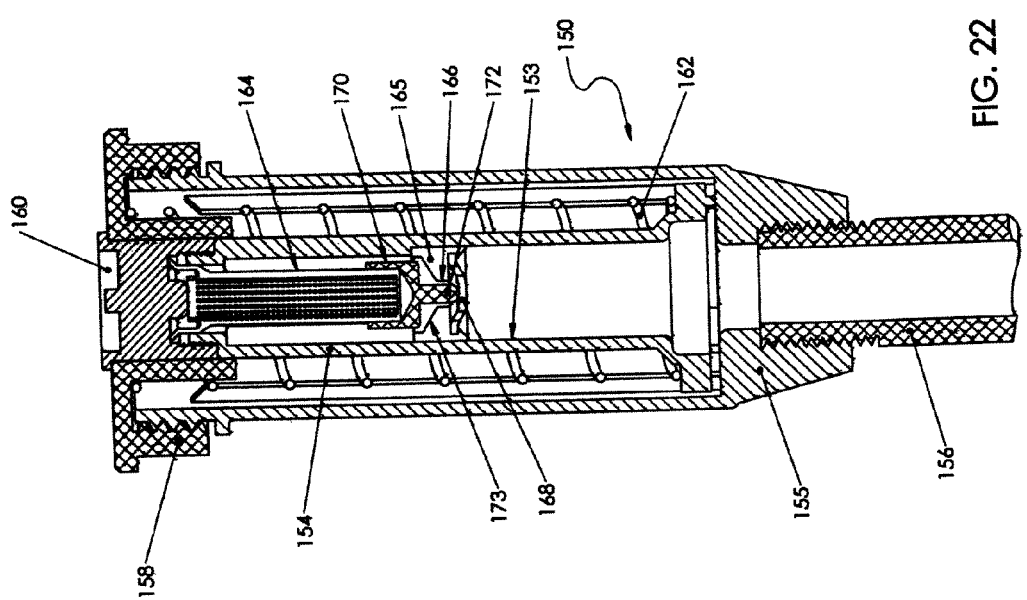
FIG. 22 is a vertical cross-sectional view of a sprinkler head apparatus with a check valve assembly according to another embodiment of the invention.

FIGS. 22 and 23 illustrate a pop up sprinkler assembly 150 according to another embodiment of the invention, in which the coupling sleeve is eliminated and a check valve assembly 152 is instead installed directly in the fluid passageway 153 in pop up stem 154. The sprinkler assembly 150 basically comprises an outer body 155 mounted on riser tube 156 at its lower end and having a removable cap 158 at its upper end, and a pop-up stem or tube 154 slidably mounted in the body for movement between the retracted position illustrated in FIG. 22 and a raised, operative position in which a sprinkler head or insert 160 at the upper end of the stem projects upwardly through the cap and out of the ground. The stem is biased into the retracted position by return spring 162, and is forced into the raised position when the water pressure supplied to the sprinkler head is sufficient to overcome the spring force. A filter 164 is mounted in the pop-up tube beneath sprinkler head 160 in a conventional manner. The filter may be eliminated in alternative embodiments.

The check valve assembly 152 of this embodiment comprises a valve seat member 165 which is a press fit in the pop up tube 154 and has a central passageway or opening 166, a disc valve 168 which is retained against the lower face of the valve seat, and an actuator 170 which is mounted on the end of the filter 164 and has a piston 172 extending through the passageway 166 in the valve seat to engage the central region of disc valve 168. The valve seat 165 has a tapered guide surface 173 leading to passageway 166 for centering the piston 172.

The disc valve 168 may be identical to the disc valve 16 with openings 26 as in FIG. 1A, or may be identical to the flap valve 42 of FIG. 4. In either case, when the sprinkler head or insert 160 is secured to the upper end of the pop up tube 154, the piston 172 will push the valve 168 into the open position so that water can flow through the valve and valve seat and out of the sprinkler head. If the sprinkler head is removed for maintenance purposes, for example, or is broken off, water pressure will force the valve into the closed position, cutting off the water supply to the sprinkler.

FIG. 26 illustrates a modification in which an actuator piston 174 is formed integrally at the end of the filter 164, rather than in a separate actuator secured to the end of the piston as in FIGS. 22 and 23.

Figure 24:
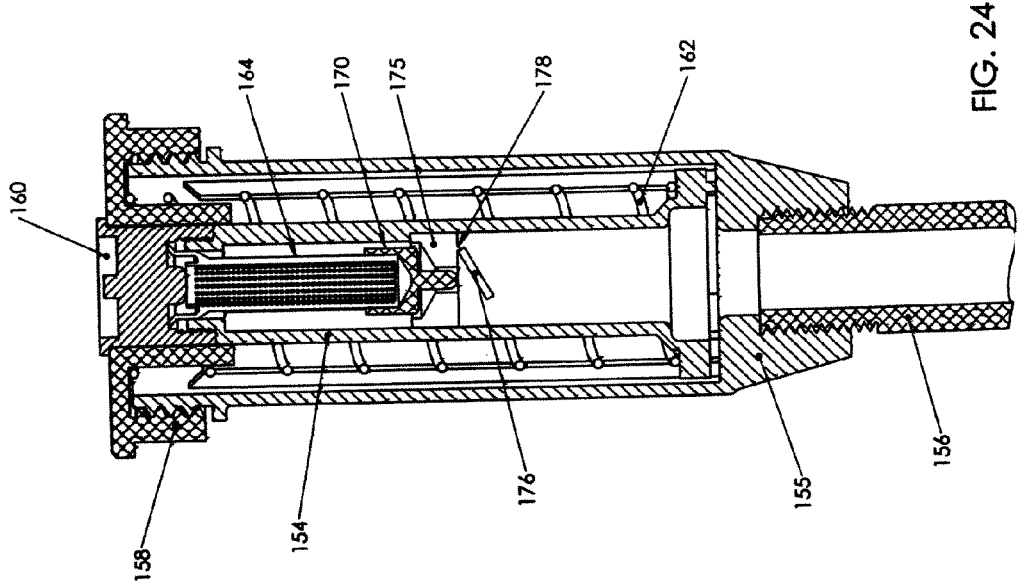
FIG. 24 is a vertical cross-sectional view similar to FIG. 22 showing a modified check valve assembly.

FIGS. 24 and 25 illustrate another modification to the valve assembly. In this case, rather than having a separate disc valve retained against the valve seat, the valve seat 175 has a flapper valve 176 mounted at its lower end via a hinge 178 located to one side of the passageway 180 through the valve seat. The valve seat may be formed integrally with the valve 176, with the hinge 178 comprising an integral hinge formed by a thin piece of material between the flapper valve and valve seat. In this case, the unitary valve seat and valve member may be of rigid plastic material such as polypropylene or the like. Alternatively, the valve seat may be of metal such as brass, with a separate flapper valve pivotally secured to the seat at the same location via a hinge pin or the like.

The arrangement of FIGS. 24 and 25 has the advantage that a reduced number of parts are required and there is no need for any separate snap fitting or retention device for holding the disc valve in place, as was required in the previous embodiments. It will be understood that the integral valve seat and valve may be used in place of the separate valve seat and valve disc of any of the previous embodiments.

Figure 27:
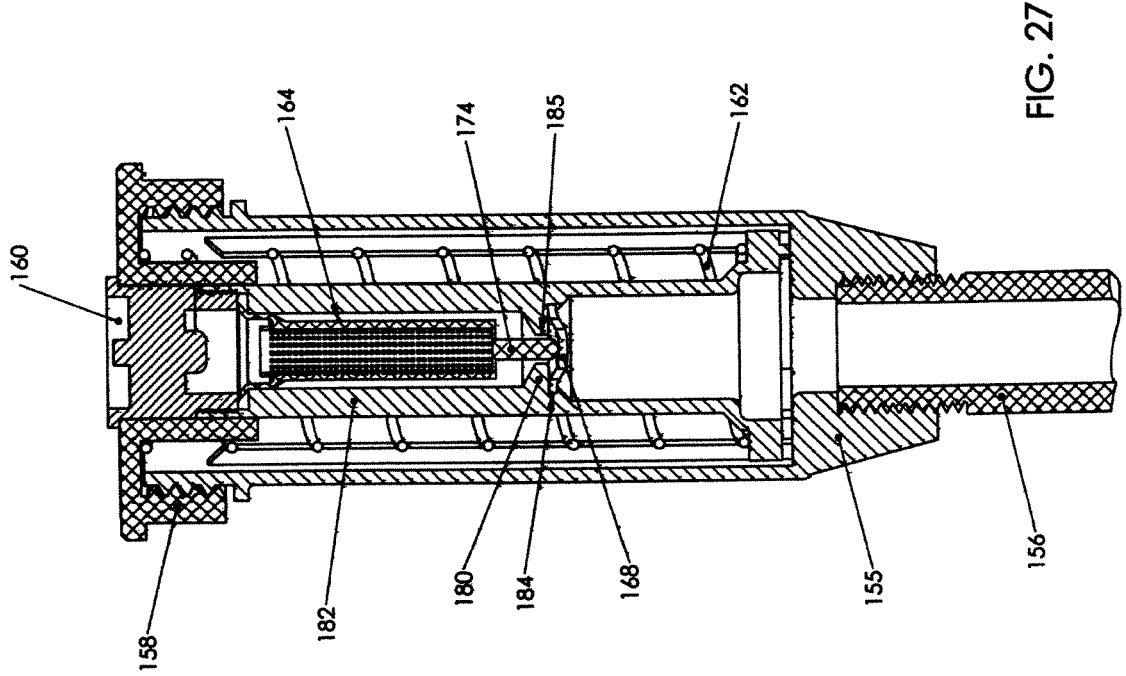
FIG. 27 is a vertical cross-sectional view illustrating a modification of the check valve assembly of FIGS. 22 and 23.

FIG. 27 illustrates another modified embodiment in which a valve seat 180 is molded into the through bore or passageway in a pop up tube or stem 182 of a sprinkler head. Other parts of the sprinkler head are identical to the embodiments of FIGS. 22 to 26, and like reference numerals are used for like parts as appropriate. As in the embodiment of FIG. 22, a disc valve 168 is retained adjacent the lower end of the valve seat. For example, the valve 168 may be a snap fit in an annular groove or indent 184 adjacent the valve seat. Actuator piston 174 extends from the filter 164 through the central opening or passageway 185 in the valve seat in order to urge the valve 168 into an open position. Valve 168 may be identical to the disc valve 16 of FIG. 1A, as illustrated, or may be a flap valve 42 as illustrated in FIG. 4.

Figure 29:
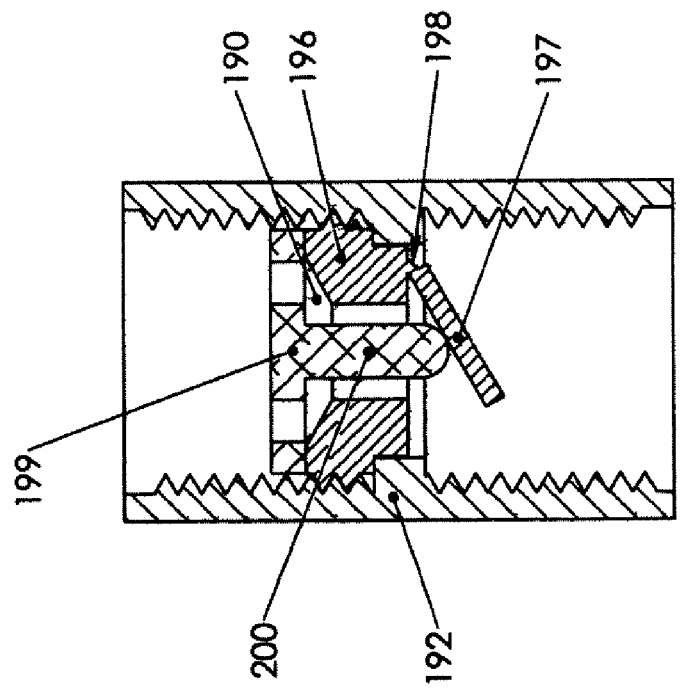
FIG. 29 is a vertical cross-sectional view similar to FIG. 28, illustrating the valve in the open position.
Figure 28:
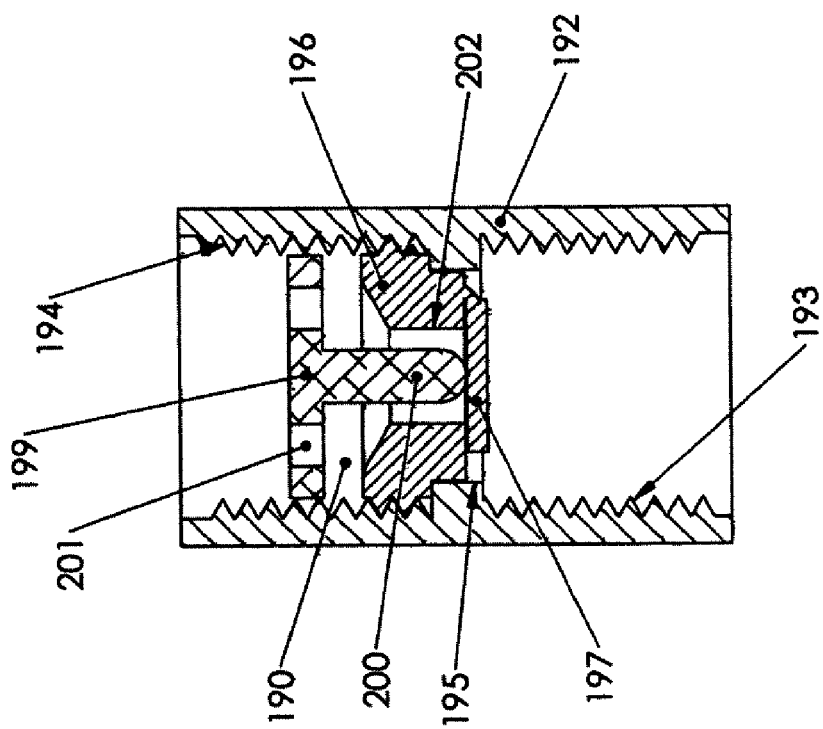
FIG. 28 is a vertical cross-sectional view of a check valve assembly according to another embodiment of the invention, illustrating the valve in the closed position.
Figure 30:
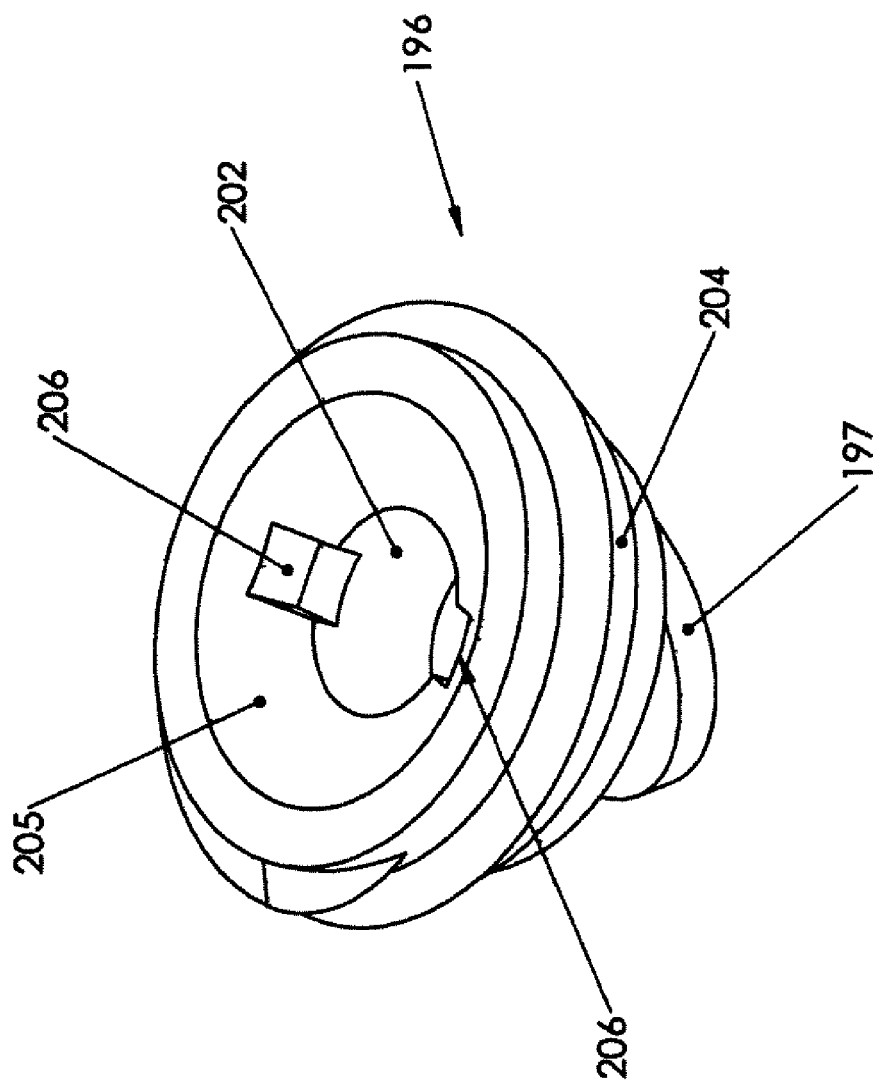
FIG. 30 is a perspective view of an alternative unitary valve seat and valve member for use in the assembly of FIGS. 28 and 29.

FIGS. 28 to 30 illustrate a check valve assembly 190 according to another embodiment of the invention. In this case, the check valve assembly may be mounted in any standard threaded coupling for plumbing purposes, such as coupling 192 as illustrated in FIGS. 28 and 29. Coupling 192 comprises a tubular member having first and second sets of internal threads 193,194 separated by an annular shoulder 195. The valve assembly of this embodiment comprises a valve seat 196 designed for threaded engagement in one end of the coupling 192, a flapper valve 197 hinged to one end of the valve seat at hinge 198, and an actuator 199 slidably mounted in the coupling bore and having a piston 200 which extends through a central opening 202 in the valve seat to operate the flapper valve. Actuator 199 has a series of openings 201 for fluid flow through the actuator.

As best illustrated in FIG. 30, the valve seat 196 has external screw threads 204 and may be provided in different sizes and with different threads for fitting in any standard pipe coupling. The seat 196 has a tapered guide inlet 205 leading up to the central opening or passageway 202, with opposing indents 206 for engagement by the end of a screwdriver for screwing the device into and out of a threaded pipe coupling. The valve seat 196 may be made of polypropylene with an integral flapper valve 197 secured to the seat via an integral hinge 198 formed by a thin web of the seat material. Alternatively, the valve seat may be made of metal such as brass and the flapper valve may be a separate brass disc hinged to the end of the valve seat with a hinge pin or the like.

FIG. 28 illustrates the valve in the closed position blocking fluid flow through the coupling, while FIG. 29 illustrates the valve in an open position with the piston 200 projecting through the valve seat and pushing the flapper valve away from the valve seat. In this position, fluid can flow through the coupling via the open valve, the valve seat opening 202, and the openings 201 in the actuator.

The valve assembly of FIGS. 28 to 30 may be installed in a pipe fitting in any plumbing application where a check valve is required, as well as in any standard irrigation sprinkler. In the latter case, coupling 192 containing the valve assembly may be positioned in a sprinkler head in place of the custom coupling sleeve 14 of FIGS. 2 to 6, for example. In a general plumbing application, the check valve may be located in a coupling between two pipe sections, or in a tap or the like, and will be held open by the end of one of the pipe sections threaded into the threaded end 194 and bearing against the actuator 199 to push it into the operative position of FIG. 29. If the pipe section is removed for maintenance purposes, the fluid flowing in the other section will force the flapper valve 197 closed, and simultaneously urge the actuator back into the inoperative position of FIG. 28. The check valve assembly of FIGS. 28 to 30 therefore provides a simple and inexpensive check valve which can be installed easily in any fluid supply line.

Figure 31:
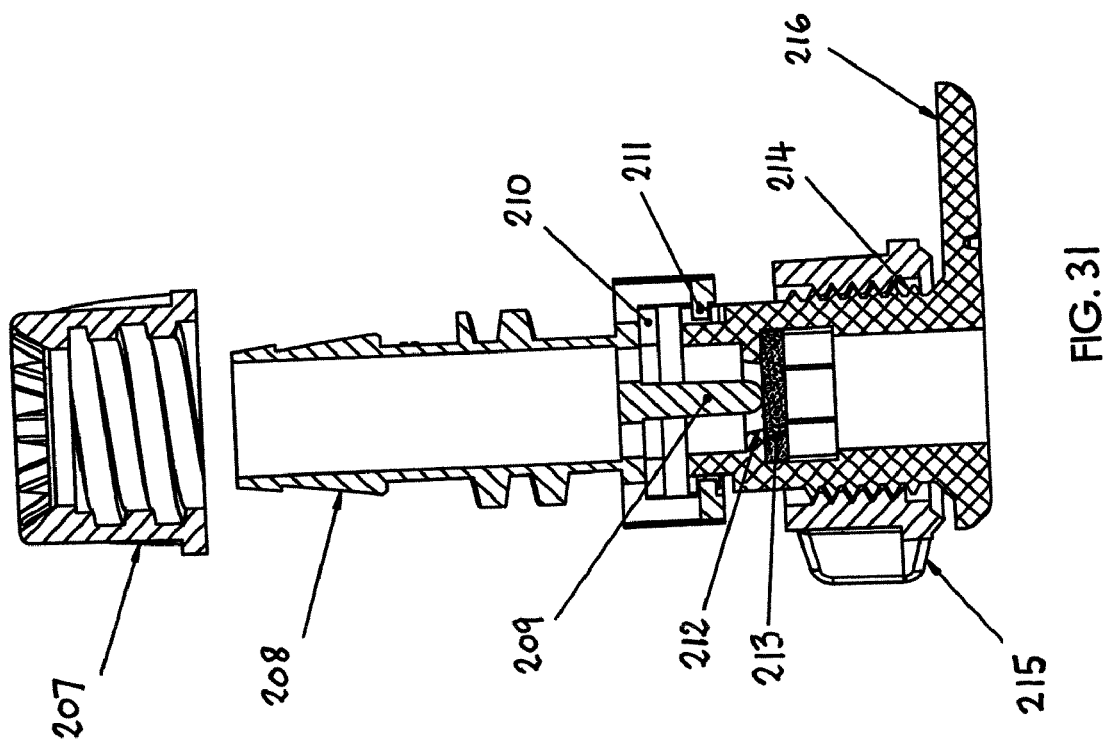
FIG. 31 is a vertical cross-sectional view of one embodiment of a drip tubing and channeled check valve assembly for use in lay-flat hose applications, showing the channeled check valve in the closed position.
Figure 32:
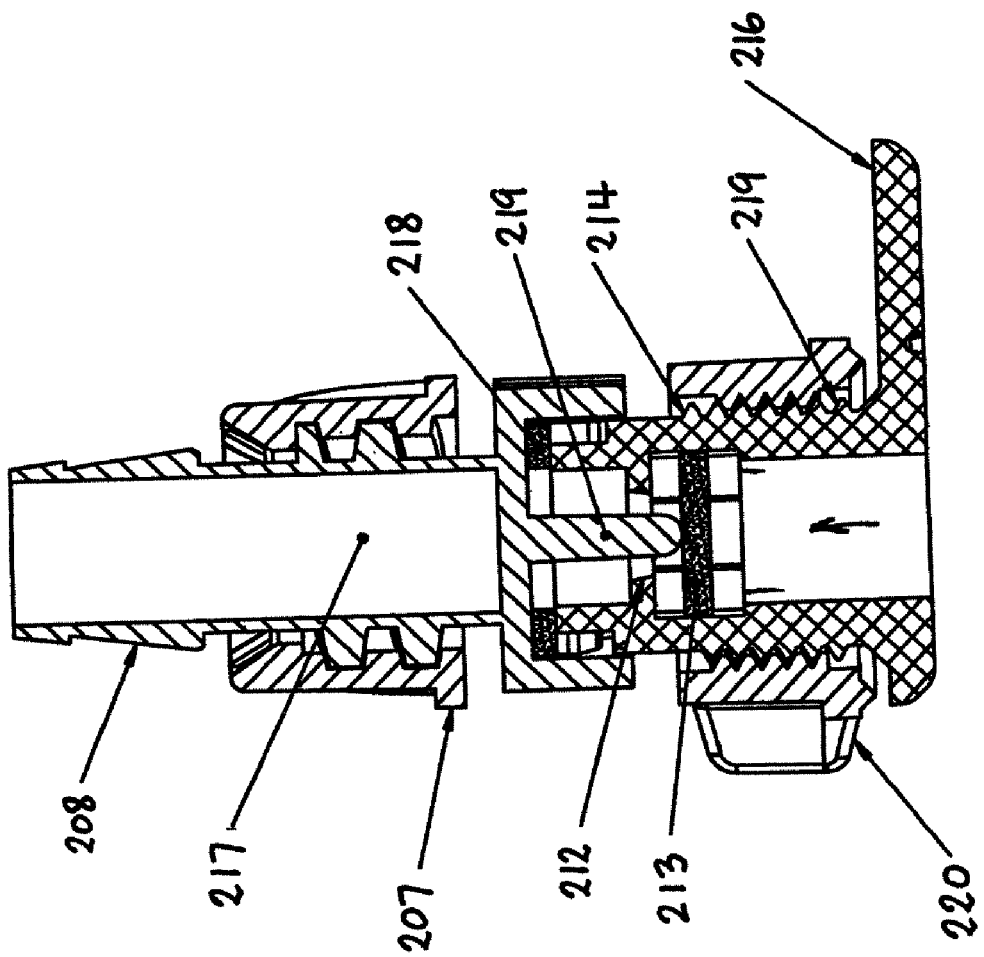
FIG. 32 is a vertical cross-sectional view of another embodiment of a drip tubing and channeled check valve assembly for use in lay-flat hose applications, with the drip-tubing locknut threadably engaged on the drip-tube flow channel and the channeled check valve in the open position.
Figure 33:
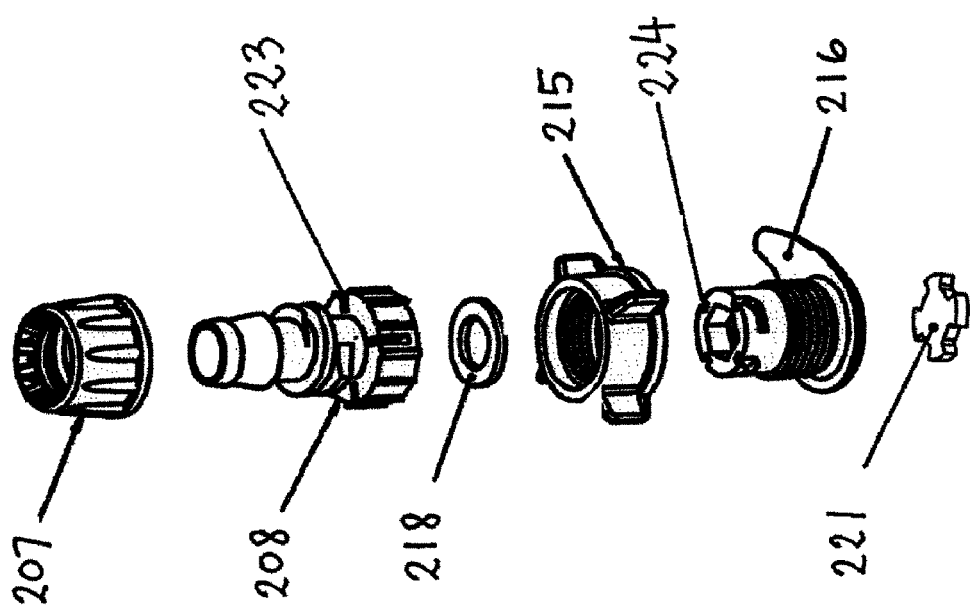
FIG. 33 is an exploded view of the components of the drip-tubing and channeled check valve assembly of FIG. 32.
Figure 34A:
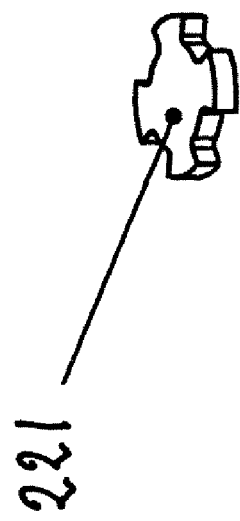
FIG. 34A illustrates a channeled check valve having four channels.
Figure 34B:
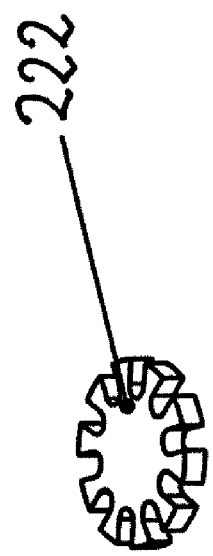
FIG. 34B illustrates a channeled check valve having ten channels.

FIG. 31 illustrates a vertical cross-sectional view of one embodiment of a drip tubing and channeled check valve assembly for use in lay-flat hose applications, showing the channeled check valve 213 in the closed position. Lay-flat nipple 216 slides through a hole in lay-flat hose (not shown), and winged locking nut 215 of lay-flat nipple 216 threadably engages lay-flat nipple threads 214, thereby locking lay-flat nipple 216 onto the lay-flat hose. Barbed hose nut 208 facilitates engagement of drip irrigation tube (not shown) or drip tape (not shown), which tube or tape is secured to barbed hose nut 208 via drip tubing locknut 207, drip tubing locknut 207 being dimensioned to accommodate a drip irrigation tube or drip tape via threadable engagement with barbed hose nut 208. As depicted in FIG. 31, channeled check valve 213 is in the closed position, seated against valve seat shoulder 212. When actuator pin/piston 209 is depressed, channeled check valve 213 is displaced away from valve seat shoulder 212, thereby allowing water to flow from lay-flat pipe to drip tubing or drip tape;

FIG. 32 illustrates a vertical cross-sectional view of another embodiment of a drip tubing and channeled check valve assembly for use in lay-flat hose applications, showing the channeled check valve 213 in the open position. Lay-flat nipple 216 slides through a hole in lay-flat hose (not shown), and winged locking nut 220 of lay-flat nipple 216 threadably engages lay-flat nipple threads 219, thereby locking lay-flat nipple 216 onto the lay-flat hose. Barbed hose nut 208 facilitates engagement of drip irrigation tube (not shown) or drip tape (not shown), which tube or tape is secured to barbed hose nut 208 via drip tubing locknut 207, drip tubing locknut 207 being dimensioned to accommodate a drip irrigation tube or drip tape via threadable engagement with barbed hose nut 208;

FIG. 33 illustrates an exploded view of the components of yet another embodiment of a drip-tubing and channeled check valve assembly. In this embodiment, barbed hose nut 208 is equipped with quick connect/disconnect features comprising a set of extending tabs 223 disposed inside the cap portion of barbed hose nut 208, which tabs fittingly engage slots 224 disposed at the top of lay-flat nipple 216;

FIG. 34A illustrates a channeled check valve having four channels;

FIG. 34B illustrates a channeled check valve having ten channels;

In each of the various embodiments described with respect to FIGS. 1-30 above, no separate biasing means is required to urge the check valve into the closed position. The water pressure in the system will close the valve. The check valve is a simple flat disc valve which has either a central region or a flap urged away from the valve seat by the actuator. The central region or flap will be urged back into the closed position on release of the actuator, for example when a sprinkler head is removed in a pop up sprinkler arrangement, or on removal of a connected pipe section. The valve may be manufactured simply and inexpensively by stamping from rubber material such as neoprene or the like, or may be molded from plastic material of a suitable hardness, such as polypropylene.

A small orifice may be provided at the center of the check valve. This will allow a small stream of water to exit the valve assembly when the valve is closed, facilitating cleaning of a screen filter if used in the assembly. Another advantage of a small central orifice in the valve is that a trickle of water will be seen after a sprinkler head has been broken off or removed, indicating to operators that the sprinkler needs to be repaired at that location. It is otherwise difficult to determine when sprinkler heads are broken or missing, particularly in a large irrigation area.

An advantage of the check valve assembly of this invention is that it allows a malfunctioning sprinkler head or other output device to be removed for repair or replacement without shutting down the entire sprinkler system. As soon as the sprinkler head is removed, the check valve closes automatically, shutting off the water supply. The valve will re-open automatically when the sprinkler head is replaced. Although the check valve assembly is described above for use with a sprinkler head of an irrigation or watering system, it may also be used in a hydraulic or pneumatic system, or any system in which a fluid is provided to an outlet head or tap. The check valve assembly which can be simply installed in a standard pipe coupling as in FIGS. 28 to 30 is particularly suitable for such applications. The check valve assembly in each case will shut off the supply to the outlet if the outlet head is removed for repair or replacement.

FIGS. 35, 36, 37A and 37B show a channeled shaft check valve assembly 300. Unlike some of the other embodiments disclosed herein, in this embodiment the valve member 310 includes shaft 314 as well as disc 312. Sleeve 320 is inserted into conduit 330 and includes a valve seat 322 within its interior. Valve seat 322 has a central opening 324 through which fluid flows when valve member 310 is in the open position. Channel 316 in shaft 314 promotes fluid flow along shaft 314 and through central opening 324. Disc 312 preferably has at least one channel or opening 317 also to promote fluid flow.

Conduit 330 includes inlet end 332 for connection to a pressurized fluid supply and outlet end 334 for attachment to an outlet, such as outlet fixture 350. When outlet fixture 350 is not present, pressurized fluid flow urges valve member 310 towards the outlet end of conduit 330 and against valve seat 322. Thus, the pressurized fluid flow seats valve member 310 on valve seat 322 so that the fluid flow through central opening 324 is not possible. In other words, when outlet fixture 350 is not present, the pressurized fluid flow holds channeled shaft check valve assembly 300 in the closed position.

However, when outlet fixture 350 is attached to outlet end 334, outlet fixture 350 forces actuating member 340 downward and against the upper end of shaft 314. Actuating member 340 is preferably, but not necessarily, a filter element. The downward pressure exerted by actuating member 340 on shaft 314 counteracts the pressurized fluid flow urging valve member 310 against the valve seat. When outlet fixture 350 is attached to outlet end 334, valve member 310 is urged into the open position with disc 312 spaced away from valve seat 322. Due to the presence of channel 316, fluid is able to flow through channel 316 along shaft 314 and through central opening 324. In other words, when outlet fixture 350 is attached, the assembly 300 is in the open position, and when outlet fixture 350 is removed, the assembly is in the closed position. Among other things, this facilitates the changing of outlet fixtures and conserves water.

The various valve components may be made from any suitable material. For example, valve member 310 and/or sleeve 320 are preferably made from a rigid plastic such as polypropylene. However, they may also be a generally flexible material without departing from the spirit of the invention. Persons of ordinary skill in the art will be aware that a wide variety of materials are contemplated by the present invention.

FIG. 39 shows a channeled shaft check valve assembly 302 according to an alternative embodiment of the present invention. In this embodiment, an assembly similar to that described above with reference to FIGS. 35-37B is incorporated within a popup sprinkler. Conduit 335 is encased within outer sprinkler body 360 with its inlet end attached to pressurized fluid supply 11. A spring 336 surrounds conduit 335 to retract the popup when there is no pressure in the system. As with the previously described embodiment, when outlet fixture 350 is secured to the outlet end of conduit 335, actuating member 340 is thrust downward against valve member 310, thus unseating it from valve seat 322 and placing the valve in the open position. In FIG. 39, the valve is shown in the open position.

FIGS. 40 and 41 show yet another embodiment of the present invention, in which valve member 410 includes two disc members, first disc member 413 and second disc member 412. Both discs are attached to channeled shaft 414 which includes channel 415 running along at least a portion of its length. One of discs 412 and 413 may be integral with shaft 414 while the other is be detachable, or both discs may be detachable. In FIG. 41, second disc 412 is shown as integral with shaft 414 while first disc 413 is attachable to shaft 414. In other words, in the embodiment illustrated in FIG. 41, first disc 413 is essentially a cap placed on the end of shaft 414.

In this embodiment, the valve may have three positions. In the open position, an outlet fixture is attached to outlet end 421 of sleeve 420. The outlet fixture either directly contacts against second disc member 412, or indirectly contacts second disc member 412 via an actuating member such as a filter, to urge valve member 410 downward so as to unseat first disc member 413 from lower valve seat 430. However, pressurized fluid entering sleeve 420 through inlet end 422 prevents valve member 410 from moving so far downward that second disc member 412 seats against upper valve seat 435. Thus, when the assembly 400 is in the open position, neither disc member 412 or 413 is seated against its respective valve seat 435 or 430. The force provided by the pressurized fluid prevents second disc member 412 from seating in upper valve seat 435, while the force provided by the outlet fixture prevents first disc member 413 from seating in lower valve seat 430.

The assembly 400 is in a first closed position when no outlet fixture is present so that the pressurized fluid seats first disc member 413 against lower valve seat 430. The assembly 400 is in a second closed position when there is no pressurized fluid supplied to inlet end 422 of sleeve 420. In that situation, second disc member 412 rests on upper valve seat 435, thus preventing backflow from the outlet fixture. An advantage of the assembly 400 is its ability to prevent soil or other debris from entering the fluid supply system.

FIGS. 42A-C show various alternative configurations of first disc member 412 and shaft 414. The junction between first disc member 412 and shaft 414 may consist of a curved beveled seam as in FIG. 42A, a straight beveled seam as in FIG. 42B, or simply a right angle as in FIG. 42C. Persons of ordinary skill in the art will be aware that many types of variations in the precise shapes of disc members 412 and 413 and shaft 414 may be used without departing from the spirit of the invention.

It is to be understood that the present invention contemplates combining various components from any one of the embodiments described above with components from other embodiments. For example, the channeled check valve members 310 and 410 may be incorporated into valve assemblies disclosed in any of the various Figures and accompanying description. Various modifications and alterations of the invention will become apparent to those skilled in the art without departing from the spirit and scope of the invention, which is defined by the accompanying claims. For example, it should be noted that steps recited in any method claims below do not necessarily need to be performed in the order they are recited. For example, in certain embodiments, steps may be performed simultaneously. The accompanying claims should be constructed with these principles in mind.

Any element in a claim that does not explicitly state "means for" performing a specified function or "step for" performing a specified function is not to be interpreted as a "means" or "step" clause as specified in 35 U.S.C. §112, ¶6.

What is claimed is:

1. A check valve assembly, comprising:
   a conduit having an inlet end for connection to a pressurized fluid supply and an outlet end;
   an outlet fixture releasably coupled to the outlet end of the conduit;
   a sleeve mounted within the conduit, the sleeve having an internal valve seat with a central opening for fluid flow;
   an actuating member contained inside the conduit between the outlet fixture and the valve seat;
   a valve member mounted within the sleeve, the valve member comprising a disc on the opposite side of the valve seat from the outlet end of the conduit and a channeled shaft extending outward from the center of the disc and through the central opening in the internal valve seat, wherein the disc has a channel passing therethrough, the valve member being movable between an open position with the disc unseated from the valve seat allowing fluid flow along the channeled shaft and through the central opening in the valve seat and a closed position with the disc seated against the valve seat by pressurized fluid in the conduit, and wherein an outer perimeter of the disc contacts an interior surface of the sleeve both when the valve member is in the open or closed position;
   wherein when the outlet fixture is coupled to the outlet end of the conduit, the actuating member contacts the channeled shaft of the valve member and urges the valve member away from the valve seat and into the open position, and wherein when the outlet fixture is removed from the outlet end of the conduit, the pressurized fluid urges the valve member into the closed position with the disc seated against the valve seat.

2. The check valve assembly of claim 1, wherein the actuating member is a filter element.

3. The check valve assembly of claim 1, wherein the actuating member is integral with the outlet fixture.

4. The check valve assembly of claim 1, wherein the actuating member is completely separate from the outlet fixture.

5. The check valve assembly of claim 1, wherein the actuating member is releasably connectable to the outlet fixture.

6. The check valve assembly of claim 1, wherein the disc of the valve member comprises an outer periphery with at least one channel.

7. The check valve assembly of claim 1, wherein the disc of the valve member comprises an outer periphery with at least one opening.

8. The check valve assembly of claim 1, wherein the valve seat is formed inside a sleeve inserted into the conduit between the inlet end and the outlet end.

* * * * *